(12) United States Patent
Tokozakura et al.

(10) Patent No.: US 10,287,964 B2
(45) Date of Patent: May 14, 2019

(54) VEHICULAR COOLING SYSTEM

(71) Applicant: TOYOTA JIDOSHA KABUSHIKI KAISHA, Toyota-shi (JP)

(72) Inventors: Daisuke Tokozakura, Susono (JP); Kazuya Arakawa, Fujinomiya (JP); Takahiro Shiina, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 350 days.

(21) Appl. No.: 15/386,835

(22) Filed: Dec. 21, 2016

(65) Prior Publication Data

US 2017/0175612 A1 Jun. 22, 2017

(30) Foreign Application Priority Data

Dec. 21, 2015 (JP) .................................. 2015-248591
Dec. 9, 2016 (JP) .................................. 2016-239824

(51) Int. Cl.
| | |
|---|---|
| *F01P 7/14* | (2006.01) |
| *F01P 3/18* | (2006.01) |
| *B60K 1/00* | (2006.01) |
| *B60K 1/02* | (2006.01) |
| *B60K 6/20* | (2007.10) |
| *B60K 7/00* | (2006.01) |
| *B60K 17/14* | (2006.01) |
| *F01P 3/00* | (2006.01) |

(52) U.S. Cl.
CPC .................. *F01P 7/14* (2013.01); *B60K 1/00* (2013.01); *B60K 1/02* (2013.01); *B60K 6/20* (2013.01); *B60K 7/0007* (2013.01); *B60K 17/145* (2013.01); *F01P 3/18* (2013.01); *B60K 2001/006* (2013.01); *B60K 2007/0061* (2013.01); *B60Y 2200/92* (2013.01); *B60Y 2400/73* (2013.01); *F01P 2003/008* (2013.01); *F01P 2007/146* (2013.01); *F01P 2050/24* (2013.01); *F01P 2060/045* (2013.01)

(58) Field of Classification Search
CPC ...... F01P 7/14; F01P 3/18; B60K 1/00; B60K 1/02; B60K 6/20; B60K 7/0007
See application file for complete search history.

(56) References Cited

U.S. PATENT DOCUMENTS

| 5,372,213 A | 12/1994 | Hasebe et al. |
| 2002/0073726 A1 | 6/2002 | Hasebe et al. |
| 2004/0045749 A1* | 3/2004 | Jaura ........................ B60K 6/22 180/65.26 |

(Continued)

FOREIGN PATENT DOCUMENTS

| AT | 505 980 B1 | 9/2010 |
| CN | 102039803 A | 5/2011 |

(Continued)

*Primary Examiner* — Kevin A Lathers
(74) *Attorney, Agent, or Firm* — Oblon, McClelland, Maier & Neustadt, L.L.P.

(57) ABSTRACT

An cooling system including an oil circulation circuit includes a first circuit including an electric oil pump that discharges oil as a coolant to be supplied to an inverter and respective motors, and an HV radiator that cools the oil to be supplied to the inverter and the respective motors, and a second circuit including a mechanical oil pump that discharges the oil to be supplied to a lubrication-required part without passing through the HV radiator.

13 Claims, 8 Drawing Sheets

(56) References Cited

U.S. PATENT DOCUMENTS

| | | |
|---|---|---|
| 2011/0084561 A1 | 4/2011 | Swales et al. |
| 2011/0232786 A1* | 9/2011 | Matsushita ............ B60K 6/445 137/565.11 |
| 2013/0173104 A1 | 7/2013 | Miyamoto et al. |
| 2013/0270938 A1 | 10/2013 | Matsuda |
| 2017/0144532 A1* | 5/2017 | Tokozakura ............. B60K 1/02 |

FOREIGN PATENT DOCUMENTS

| | | |
|---|---|---|
| CN | 103155381 A | 6/2013 |
| DE | 10 2013 204 766 A1 | 9/2014 |
| JP | 6-98417 A | 4/1994 |
| JP | 11-107748 A | 4/1999 |
| JP | 2002-187435 A | 7/2002 |
| JP | 2004-072933 A | 3/2004 |
| JP | 2004-324445 A | 11/2004 |
| JP | 2011-098628 A | 5/2011 |
| JP | 2012-171557 A | 9/2012 |
| JP | 2013-138584 A | 7/2013 |
| JP | 2013-199853 A | 10/2013 |
| JP | 2015-218789 A | 12/2015 |
| JP | 2015-218869 A | 12/2015 |

* cited by examiner

《TEMPERATURE CHARACTERISTIC OF T/M UNIT LOSS》

VEHICULAR COOLING SYSTEM

INCORPORATION BY REFERENCE

The disclosure of Japanese Patent Application No. 2016-239824 filed on Dec. 9, 2016 including the specification, drawings and abstract is incorporated herein by reference in its entirety.

BACKGROUND

1. Technical Field

The present disclosure relates to a vehicular cooling system.

2. Description of Related Art

As cooling systems for hybrid vehicles with an engine and electric motors installed therein, inverter cooling circuits for cooling an inverter electrically connected to the electric motors are known. It is known that the inverter cooling circuits circulate cooling water (hybrid cooling water) as a coolant.

Also, engine cooling circuits using cooling water (engine cooling water) that is different from hybrid cooling water as a coolant are publicly known. Japanese Patent Application Publication No. 2013-199853 discloses a cooling system including an engine cooling circuit, and a transaxle cooling circuit using oil as a coolant, in which heat exchange between engine cooling water and the oil is performed by a heat exchanger.

SUMMARY

In a hybrid vehicle, a cooling system including an inverter cooling circuit, an engine cooling circuit and a transaxle cooling circuit may be installed. In the respective cooling circuits mentioned above, dedicated liquids such as hybrid cooling water, engine cooling water and oil are circulated in respective independent flow passages. Thus, the number of parts included in the respective cooling circuits is large and the cooling system has a large size as a whole.

Also, in the transaxle cooling circuit described in JP 2013-199853 A, a part requiring oil lubrication or oil warming (lubrication-required part) and a part requiring oil cooling (cooling-required part) are included in a transaxle case, which is an oil supply destination. In order to reduce a stirring resistance of oil, it is necessary to supply warm oil to, e.g., transmission gears, which are included in the lubrication-required part. On the other hand, it is necessary to supply low-temperature oil to the electric motors, which are included in the cooling-required part, to cool the electric motors.

However, in the configuration in JP 2013-199853 A, the oil in the transaxle cooling circuit is supplied to the lubrication-required part and the cooling-required part in the transaxle case without distinction. Thus, where cooling is prioritized over lubrication, a part to be warmed (lubrication-required part) is also cooled simultaneously with a part to be cooled (cooling-required part). On the other hand, where lubrication is prioritized over cooling, the part to be cooled (cooling-required part) is also warmed simultaneously with the part to be warmed (lubrication-required part).

The present disclosure provides a vehicular cooling system enabling reduction in size of a cooling system and ensuring both cooling performance and lubrication performance.

A vehicular cooling system according to an aspect of the present disclosure is installed in a vehicle including an electric motor, an inverter electrically connected to the electric motor, and a power transmission mechanism that transmits motive power output from the electric motor to a wheel. The vehicular cooling system includes an oil circulation circuit. The oil circulation circuit includes: an oil storage portion; a first circuit including a first oil pump that sucks in oil stored in the oil storage portion and discharges the oil as a coolant to be supplied to the inverter and the electric motor, and an oil cooler provided between the first oil pump, and the inverter or the electric motor, the oil cooler cooling the oil to be supplied to the inverter and the electric motor; and a second circuit including a second oil pump that sucks in the oil stored in the oil storage portion, and discharges the oil to be supplied to a lubrication-required part included in the power transmission mechanism without passing through the oil cooler.

According to the above aspect, only oil is circulated in the oil circulation circuit including the inverter and the electric motor. Consequently, the vehicular cooling system can be downsized. Also, as a cooling circuit, the first circuit cools the oil discharged from the first oil pump, via the oil cooler, and supplies the oil to the inverter or the electric motor. As a lubrication circuit, the second circuit supplies the oil discharged from the second oil pump, to the lubrication-required part without the oil being cooled by the oil cooler. Consequently, both cooling performance and lubrication performance can be ensured.

In the above aspect, in the first circuit, the inverter and the electric motor may be provided on a downstream side of the first oil pump, the inverter and the electric motor may be connected in series, and the electric motor may be provided on a downstream side of the inverter.

According to the above aspect, the first circuit includes the inverter between the oil cooler and the electric motor on the downstream side of the first oil pump. Where the electric motor and the inverter are compared in terms of heatproof temperature, the heatproof temperature of the inverter is lower. According to the cooling system, the first circuit enables the oil cooled by the oil cooler to be supplied to the inverter prior to the electric motor.

In the above aspect, in the first circuit, the inverter and the electric motor may be provided on the downstream side of the first oil pump, and the inverter and the electric motor may be connected in parallel.

According to the present aspect, the first circuit enables the oil cooled by the oil cooler to be supplied to the electric motor without the oil passing through the inverter on the downstream side of the first oil pump. Consequently, a temperature of the oil to be supplied to the electric motor does not increase as a result of heat exchange with the inverter, enabling the electric motor to be cooled by the low-temperature oil.

In the above aspect, the electric motor may include a stator and a rotor, and in the first circuit, an electric motor cooling pipe for supplying oil to the electric motor may include a discharge hole for discharging oil toward the stator. Also, the oil flowing in the first circuit may have an insulating property.

In the above aspect, the inverter may be configured such that the oil discharged from the first oil pump flows inside as a coolant.

According to the above aspect, the inside of the inverter can be cooled by the oil discharged from the first oil pump. Consequently, cooling performance for the inverter is enhanced and heat resistance performance of the inverter is also enhanced.

In the above aspect, the oil cooler may be an air cooling oil cooler that causes heat exchange between the oil and air.

According to the above aspect, the oil discharged from the first oil pump is cooled by the air cooling oil cooler, and thus, coolability of the oil is enhanced.

The vehicular cooling system according to the above aspect may be installed in a vehicle including the electric motor and an engine as motive power sources. The first oil pump may be an electric oil pump to be driven by an electric motor, and the second oil pump may be a mechanical oil pump to be driven by the engine.

According to the above aspect, the first oil pump is formed of an electric oil pump, and thus, even if the engine stops, the first oil pump can be driven. Also, the amount of discharge from the first oil pump can be controlled by a control unit such as an electronic control unit.

In the above aspect, the second circuit may further include a three phase heat exchanger configured to allow heat exchange between engine cooling water and the oil discharged from the second oil pump, and allows heat exchange between engine oil and the oil discharged from the second oil pump.

According to the above aspect, the three phase heat exchanger allows heat exchange between the engine cooling water and the oil discharged from the second oil pump and also allows heat exchange between the engine oil and the oil discharged from the second oil pump. Consequently, the oil that has passed through the three phase heat exchanger can be supplied to a lubrication-required part.

In the above aspect, the vehicular cooling system may further include a first switching valve provided in a circuit in which the engine cooling water circulates, the first switching valve switching between an open state in which a flow of the engine cooling water through the heat exchanger is allowed and a closed state in which a flow of the engine cooling water through the heat exchanger is not allowed; and a second switching valve provided in a circuit in which the engine oil circulates, the second switching valve switching between an open state in which a flow of the engine oil through the heat exchanger is allowed and a closed state in which a flow of the engine oil through the heat exchanger is not allowed.

According to the above aspect, a heat exchange state in the three phase heat exchanger can be controlled by switching of each of the first switching valve and the second switching valve between the open and closed states.

In the above aspect, the vehicular cooling system may further includes: a first oil temperature sensor that detects a temperature of the oil; a water temperature sensor that detects a temperature of the engine cooling water; a second oil temperature sensor that detects a temperature of the engine oil; and a control unit that controls opening-closing of each of the first switching valve and the second switching valve based on the temperature of the oil detected by the first oil temperature sensor, the temperature of the engine cooling water detected by the water temperature sensor and the temperature of the engine oil detected by the second oil temperature sensor. The control unit may be configured to, when the temperature of the oil is lower than a predetermined oil temperature, control at least the second switching valve of the first switching valve and the second switching valve to be in the open state, and perform warming control to increase the temperature of the oil via heat exchange in the heat exchanger.

According to the above aspect, the oil supplied to the lubrication-required part receives heat from at least one of the engine cooling water and the engine oil and is thereby warmed. Thus, an increase in temperature of the oil quickens, enabling quick warming of the lubrication-required part. Consequently, dragging loss and/or stirring loss caused in the lubrication-required part by the oil can be reduced, enabling enhancement in fuel efficiency.

In the above aspect, the control unit may be configured to, in a case where the control unit performs the warming control, when the temperature of the engine cooling water is higher than a predetermined water temperature, control the first switching valve and the second switching valve to be in the open states.

According to the above aspect, the oil supplied to the lubrication-required part receives heat of the engine cooling water and the engine oil and is thereby warmed, and thus, an increase in temperature of the oil quickens, enabling quick warming of the lubrication-required part. Consequently, dragging loss and/or stirring loss caused in the lubrication-required part by the oil can be reduced, enabling enhancement in fuel efficiency. Furthermore, switching of the heat exchange state in the three phase heat exchanger is performed in consideration of the temperature of the engine cooling water, enabling suppression of an adverse effect on the engine side caused by heat exchange in the heat exchanger.

In the above aspect, the control unit may be configured to, in a case where the control unit performs the warming control, when the temperature of the engine cooling water is equal to or below a predetermined water temperature and the temperature of the oil is lower than the temperature of the engine oil, control the first switching valve to be in the closed state and control the second switching valve to be in the open state.

According to the above aspect, switching of the heat exchange state in the three phase heat exchanger is performed in consideration of the temperature of the engine cooling water, enabling suppression of an adverse effect on the engine side caused by heat exchange in the heat exchanger. In other words, when the temperature of the engine cooling water is lower than the predetermined water temperature and thus warming of the engine cooling water is desired, the first switching valve is closed even during warming control to warm the oil in the second circuit being performed, enabling suppression of the oil in the second circuit from drawing heat from the engine cooling water.

In the above aspect, the oil circulation circuit includes the first circuit (cooling circuit) including the inverter and the electric motor, and the second circuit (lubrication circuit) including the lubrication-required part. Since the oil circulation circuit circulates the oil alone, the vehicular cooling system can be downsized compared to conventional cases where an inverter cooling circuit that circulates cooling water and a transaxle cooling circuit that circulates oil are separate from each other. Also, the first circuit can supply the oil cooled by the oil cooler to the inverter and the electric motor, and the second circuit can supply the oil that has not passed through the oil cooler, to the lubrication-required part. Consequently, the cooling system can ensure both cooling performance and lubrication performance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A vehicular cooling system according an embodiment of the present disclosure will be described in detail below with reference to the drawings.

First Embodiment

Figure 1:
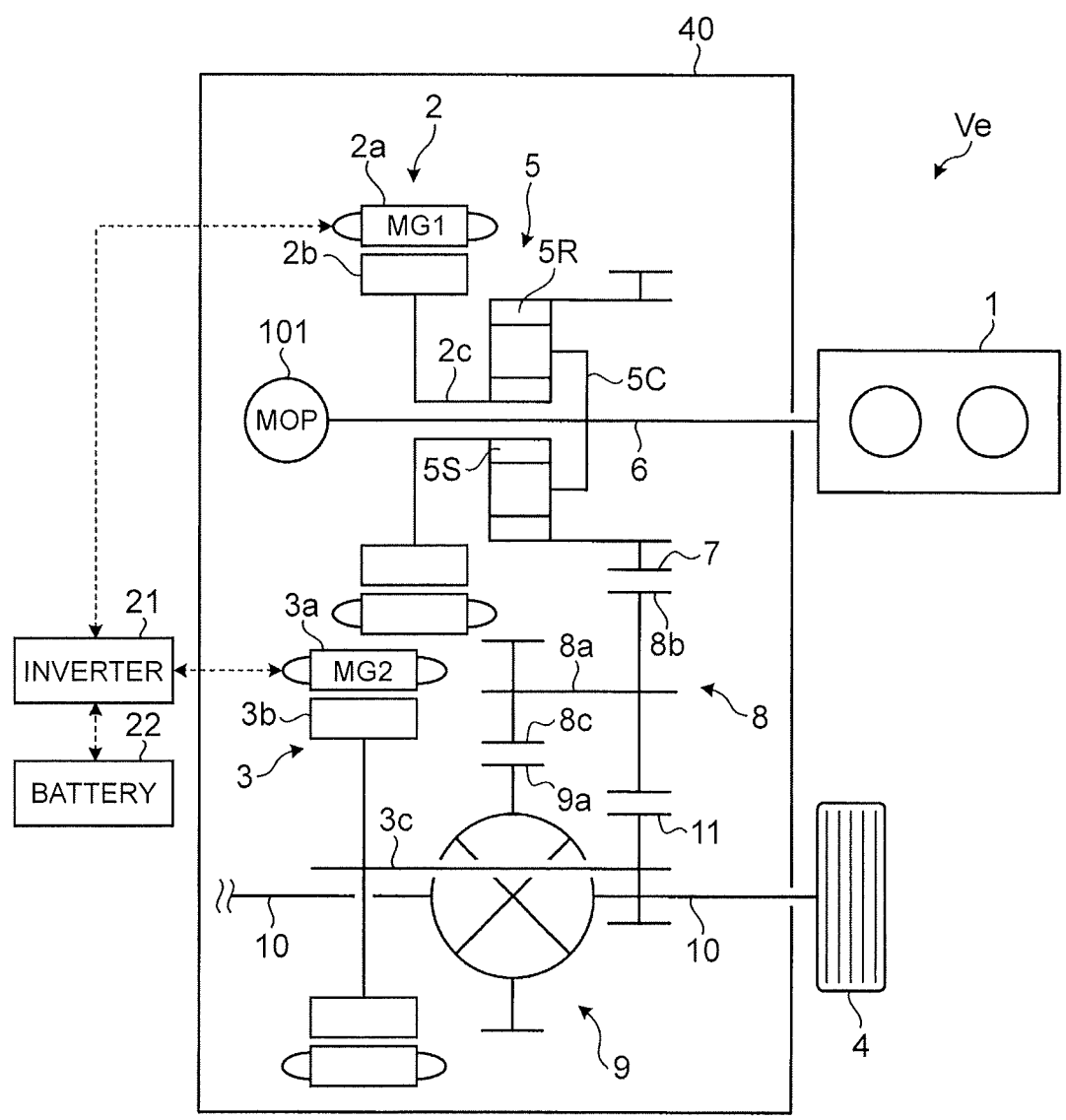
FIG. 1 is a skeleton diagram illustrating an example of a vehicle with a vehicular cooling system installed therein.

[1. Vehicle] FIG. 1 is a skeleton diagram illustrating an example of a vehicle with a vehicular cooling system installed therein. A vehicle Ve is a hybrid vehicle including an engine 1, a first motor (MG1) 2 and a second motor (MG2) 3 as motive power sources. The engine 1 is a publicly-known internal combustion engine. The motors 2, 3 are publicly-known motor-generators having a motor function and an electric power generation function. The respective motors 2, 3 are electrically connected to a battery 22 via an inverter 21. Also, the respective motors 2, 3 are included in a cooling-required part in the transaxle case 40. The inverter 21 is disposed outside the transaxle case 40.

The vehicle Ve includes a power dividing mechanism 5 in a power transmission path from the engine 1 to wheels (drive wheels) 4. In the vehicle Ve, motive power output by the engine 1 is divided to the first motor 2 side and the wheels 4 side by the power dividing mechanism 5. At this time, the first motor 2 generates electric power using the motive power output by the engine 1, and the electric power is stored in the battery 22 or is supplied to the second motor 3 via the inverter 21.

An input shaft 6, the power dividing mechanism 5 and the first motor 2 are disposed coaxially with a crankshaft of the engine 1. The crankshaft and the input shaft 6 are coupled via a non-illustrated torque limiter or the like. The first motor 2 is disposed adjacent to the power dividing mechanism 5 on the side opposite to the engine 1 in the axis direction. The first motor 2 includes a stator 2a around which a coil is wound, a rotor 2b and a rotor shaft 2c.

The power dividing mechanism 5 is a differential mechanism including a plurality of rotational elements, and in the example illustrated in FIG. 1, is formed by a single-pinion planetary gear mechanism. The power dividing mechanism 5 includes a sun gear 5S, which is an external gear, a ring gear 5R, which is an internal gear, disposed on concentrically with the sun gear 5S, and a carrier 5C holding a pinion gear engaging with the sun gear 5S and the ring gear 5R in such a manner that the pinion gear can rotate and also can revolve around the sun gear 5S, as three rotational elements.

The rotor shaft 2c of the first motor 2 is coupled to the sun gear 5S so as to rotate integrally with the sun gear 5S. The input shaft 6 is coupled to the carrier 5C so as to rotate integrally with the carrier 5C. The engine 1 is coupled to the carrier 5C via the input shaft 6. An output gear 7 that outputs torque from the power dividing mechanism 5 toward the wheels 4 side is integrated with the ring gear 5R. The output gear 7 is an external gear that rotates integrally with the ring gear 5R, and engages with a counter driven gear 8b of a counter gear mechanism 8.

The output gear 7 is coupled to a differential gear mechanism 9 via the counter gear mechanism 8. The counter gear mechanism 8 includes a counter shaft 8a disposed in parallel with the input shaft 6, a counter driven gear 8b engaging with the output gear 7, and a counter drive gear 8c engaging with a ring gear 9a of the differential gear mechanism 9. The counter driven gear 8b and the counter drive gear 8c are attached to the counter shaft 8a so as to rotate integrally. The wheels 4 are coupled to the differential gear mechanism 9 via right and left drive shafts 10.

The vehicle Ve is configured to add torque output by the second motor 3 to torque transmitted from the engine 1 to the wheels 4. The second motor 3 includes a stator 3a around which a coil is wound, a rotor 3b and a rotor shaft 3c. The rotor shaft 3c is disposed in parallel with the counter shaft 8a. A reduction gear 11 engaging with the counter driven gear 8b is attached to the rotor shaft 3c so as to rotate integrally with the rotor shaft 3c.

Also, in the vehicle Ve, a mechanical oil pump (MOP) 101 that is driven by the engine 1 is provided. The mechanical oil pump 101 is disposed coaxially with the crankshaft of the engine 1, and includes a pump rotor (not illustrated) that rotates integrally with the input shaft 6. For example, if the vehicle Ve moves forward by means of motive power of the engine 1, the pump rotor of the mechanical oil pump 101 rotates forward by means of torque of the input shaft 6, and the mechanical oil pump 101 discharges oil from a discharge port. The oil discharged from the mechanical oil pump 101 is supplied to a lubrication-required part 30 (illustrated in, e.g., FIG. 2) in the transaxle case 40 and functions as a lubricating oil. The lubrication-required part 30 is a part (mainly, gears) of a power transmission mechanism of the vehicle Ve, the part requiring oil lubrication and oil warming in the transaxle case 40. The power transmission mechanism is a mechanism that transmits motive power output from the motive power sources (the engine 1, the first motor 2 and the second motor 3) of the vehicle Ve to the wheels 4. In the vehicle Ve illustrated in FIG. 1, the lubrication-required part 30 includes the power dividing mechanism 5, the output gear 7 and the counter gear mechanism 8.

Figure 2:
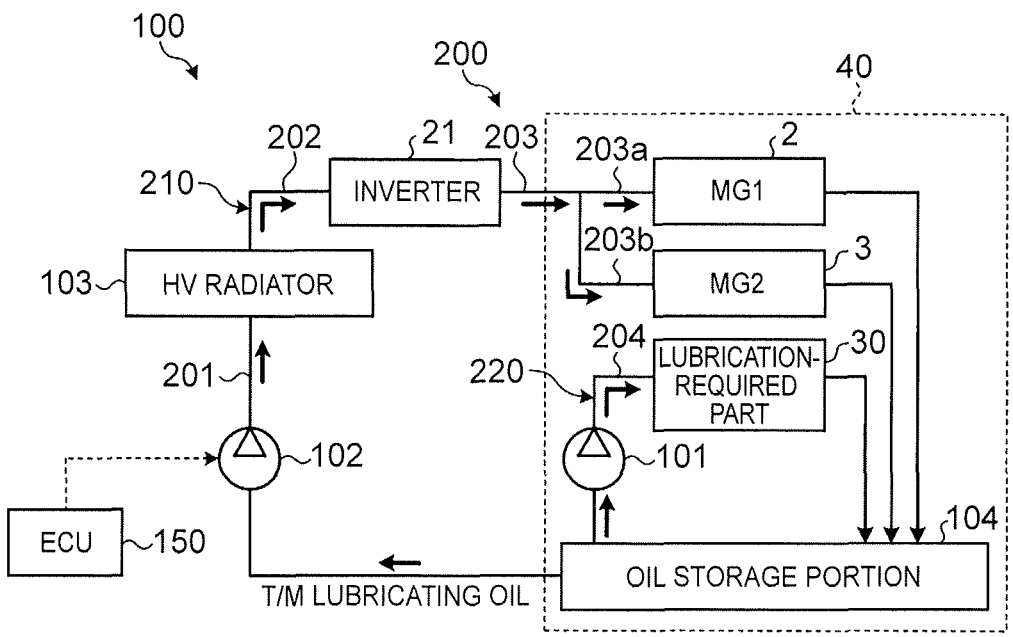
FIG. 2 is a schematic diagram illustrating a schematic configuration of the cooling system according to a first embodiment.

[2. Cooling system] FIG. 2 is a schematic diagram illustrating a schematic configuration of a vehicular cooling system 100 according to the first embodiment. The vehicular cooling system (hereinafter simply referred to as "cooling system") 100 is installed in the vehicle Ve illustrated in FIG. 1, and is configured to cool the inverter 21 using transmission lubricating oil (T/M lubricating oil). In this description, the transmission lubricating oil (T/M lubricating oil) is simply referred to as "oil".

As illustrated in FIG. 2, the cooling system 100 includes an oil circulation circuit 200 that circulates oil. The oil circulation circuit 200 includes a first circuit (hereinafter referred to as "cooling circuit") 210 for cooling the inverter 21 and the respective motors 2, 3, and a second circuit (hereinafter referred to as "lubrication circuit") 220 for lubricating and warming the lubrication-required part 30.

More specifically, the oil circulation circuit 200 has a structure in which an oil passage (inverter oil passage) that supplies oil to the inverter 21 as a coolant and a cooling oil passage that supplies oil to the cooling-required part in the transaxle case 40 included in a transaxle oil passage are in communication with each other. In other words, only one and the same liquid, which is oil, circulates in the oil circulation circuit 200 including the inverter oil passage and the transaxle oil passage. Also, the cooling system 100 pumps the oil in the oil circulation circuit 200 toward supply destinations by means of two oil pumps.

[2-1. Cooling circuit] The cooling circuit 210 includes an electric oil pump 102, which is a first oil pump, a hybrid-only radiator (hereinafter referred to as "HV radiator") 103, the inverter 21, which is a cooling target, and the respective motors 2, 3, which are cooling targets, and an oil storage portion 104. The cooling circuit 210 cools oil discharged from the electric oil pump 102, by means of the HV radiator 103, and supplies the oil to the inverter 21 and the respective motors 2, 3.

The electric oil pump 102 is driven by an electric motor (not illustrated). The electric motor is driven under control of a control unit (ECU) 150. The control unit 150 includes a publicly-known electronic control unit, and controls driving of the electric oil pump 102. The electric oil pump 102, which is driven under the control of the control unit 150, sucks in oil stored in the oil storage portion 104 and discharges the oil from a discharge port. The electric oil pump 102 discharges oil supplied to the cooling targets (the inverter 21 and the motors 2, 3) as a coolant. A first discharge oil passage 201 is connected to the discharge port of the electric oil pump 102. The oil discharged into the first discharge oil passage 201 by the electric oil pump 102 is pumped by a discharge pressure of the electric oil pump 102 toward the inverter 21 and the motors 2, 3, which are oil supply destinations, in the cooling circuit 210.

The HV radiator 103 is a heat exchanger that performs heat exchange between the oil flowing in the cooling circuit 210 and air (for example, air outside the vehicle Ve). In other words, the HV radiator 103 is an air cooling-type oil cooler that is disposed outside the transaxle case 40. The oil flowing in the HV radiator 103 releases heat as a result of heat exchange with the air outside the vehicle Ve. The HV radiator 103 is provided between the electric oil pump 102, and the inverter 21 and the motors 2, 3 in the cooling circuit 210. The cooling circuit 210 air-cools (cools) the oil pumped from the electric oil pump 102 toward the inverter 21 and the motors 2, 3, by means of the HV radiator 103. The first discharge oil passage 201 is connected to an entrance of the HV radiator 103, and a first supply oil passage 202 is connected to an exit of the HV radiator 103.

The first supply oil passage 202 is an oil passage between the HV radiator 103 and the inverter 21, the oil passage allowing oil air-cooled by the HV radiator 103 to be supplied to the inverter 21. The first supply oil passage 202 is connected to an entrance of a case of the inverter 21. The oil air-cooled by the HV radiator 103 flows into the case of the inverter 21 from the first supply oil passage 202, comes into contact with a heat generating part of the inverter 21 and performs a direct heat exchange with the heat generating part, thereby cooling the inverter 21.

A second supply oil passage 203 is connected to an exit of the case of the inverter 21. The second supply oil passage 203 is an oil passage between the inverter 21 and the motors 2, 3, the oil passage allowing oil air-cooled by the HV radiator 103 to be supplied to the respective motors 2, 3. In the cooling circuit 210, the inverter 21 and the respective motors 2, 3 are connected in series on the downstream side of the electric oil pump 102, and the respective motors 2, 3 are provided on the downstream side of the inverter 21. the respective motors 2, 3 are disposed inside the transaxle case 40, and thus, the oil to be supplied to the respective motors 2, 3 temporarily flows outside the transaxle case 40 when passing through the HV radiator 103 and the inverter 21.

Also, in the example illustrated in FIG. 2, the second supply oil passage 203 is an oil passage that forks on the downstream side. The second supply oil passage 203 includes an MG1 cooling pipe 203a and an MG2 cooling pipe 203b. The MG1 cooling pipe 203a forms one branch oil passage, and supplies oil to the first motor 2. The MG2 cooling pipe 203b forms another branch oil passage, and supplies oil to the second motor 3. More specifically, in order to cool, in particular, the stator 2a, which generates heat upon energization, in the first motor 2, the MG1 cooling pipe 203a has a structure including a discharge hole for discharging oil toward the stator 2a. In order to cool, in particular, the stator 3a, which generates heat upon energization, in the second motor 3, the MG2 cooling pipe 203b has a structure including a discharge hole for discharging oil toward the stator 3a. The respective cooling pipes 203a, 203b are disposed in the transaxle case 40.

The oil flowing from the electric oil pump 102 toward the respective motors 2, 3 in the oil cooling circuit 210 cools the respective motors 2, 3 and then flows into the oil storage portion 104 in the transaxle case 40. The oil storage portion 104 is formed by, e.g., an oil pool or an oil pan formed in a bottom portion of the transaxle case 40. For example, after cooling the respective motors 2, 3, the oil is returned to the oil storage portion 104 provided in the bottom portion of the transaxle case 40, by, e.g., gravity. As described above, when oil circulates in the cooling circuit 210, the oil stored in the oil storage portion 104 is pumped toward the inverter 21 and the respective motors 2, 3 in the cooling circuit 210, by the electric oil pump 102, cools the respective motors 2, 3 and then returns to the oil storage portion 104.

[2-2. Lubrication circuit] The lubrication circuit 220 includes the mechanical oil pump 101, which is a second oil pump, the lubrication-required part 30, which is a lubrication target, and the oil storage portion 104. The lubrication circuit 220 supplies oil discharged from the mechanical oil pump 101 to the lubrication-required part 30 without air-cooling the oil using the HV radiator 103.

The mechanical oil pump 101 is configured to be driven by the engine 1 (illustrated in FIG. 1), sucks in the oil stored in the oil storage portion 104 and discharges the oil from the discharge port. The mechanical oil pump 101 discharges oil to be supplied to the lubrication-required part 30 (gears) as a lubricating oil. A third supply oil passage 204 is connected to the discharge port of the mechanical oil pump 101. The third supply oil passage 204 includes a second discharge oil passage connected to the discharge port of the mechanical oil pump 101, and a lubricating oil passage on the downstream side of the second discharge oil passage, the lubricating oil passage allowing oil to be supplied to the lubrication-required part 30. Oil discharged from the mechanical oil pump 101 to the third supply oil passage 204 is pumped toward the lubrication-required part 30 by discharge pressure of the mechanical oil pump 101 in the lubrication circuit 220. Also, the mechanical oil pump 101 is provided inside the transaxle case 40, and thus, an entire path of the lubrication circuit 220 is formed inside the transaxle case 40. For example, the third supply oil passage 204 (lubricating oil passage), which is an oil passage (shaft core oil passage) formed in an inner portion of the input shaft 6 illustrated in FIG. 1, includes a discharge hole formed in the input shaft 6. The oil pumped from the mechanical oil pump 101 toward the lubrication-required part 30 in the lubrication circuit 220 is discharged from the third supply oil passage 204 (discharge hole of the input shaft 6) toward the power dividing mechanism 5 (lubrication-required part 30). The oil discharged from the third supply oil passage 204 lubricates a plurality of gears in the transaxle case 40.

After lubricating the lubrication-required part 30, the oil flows into the oil storage portion 104 in the transaxle case 40. For example, after lubricating the lubrication-required part 30, the oil is returned to the oil storage portion 104 by means of, e.g., gravity or a rotation force (centrifugal force) of the gears. As described above, when the oil circulates in the lubrication circuit 220, the oil stored in the oil storage portion 104 is pumped through the inside of the lubrication circuit 220 by the mechanical oil pump 101, lubricates the lubrication-required part 30 and then returns to the oil storage portion 104.

Here, the lubrication-required part 30 includes other gears to be lubricated by the oil that has lubricated certain gears. For example, in the vehicle Ve illustrated in FIG. 1, the third supply oil passage 204 (mainly, the lubricating oil passage) is formed in the inner portion of the input shaft 6, and oil that has lubricated the power dividing mechanism 5 (the sun gear 5S, the ring gear 5R and the pinion gear) from the input shaft 6 side moves by means of, e.g., gravity or a centrifugal force and lubricates other gears (the output gear 7 and the counter gear mechanism 8). The differential gear mechanism 9 can be configured so that a part of the gears is immersed in the oil in the oil storage portion 104 and takes up the oil and the differential gear mechanism 9 is thereby lubricated. Also, depending on the structure of the transaxle case 40, before oil that has lubricated the power dividing mechanism 5 lubricates the differential gear mechanism 9, the oil may be returned to the oil storage portion 104. Thus, no differential gear mechanism 9 may be included in the lubrication-required part 30.

[3. Comparison with reference example] Here, in order to describe advantages of the cooling system 100, the cooling system 100 and a reference example will be compared. First, a cooling system according to a reference example will be described with reference to FIG. 10. Next, a comparison between the cooling system 100 and the reference example will be described.

Figure 10:
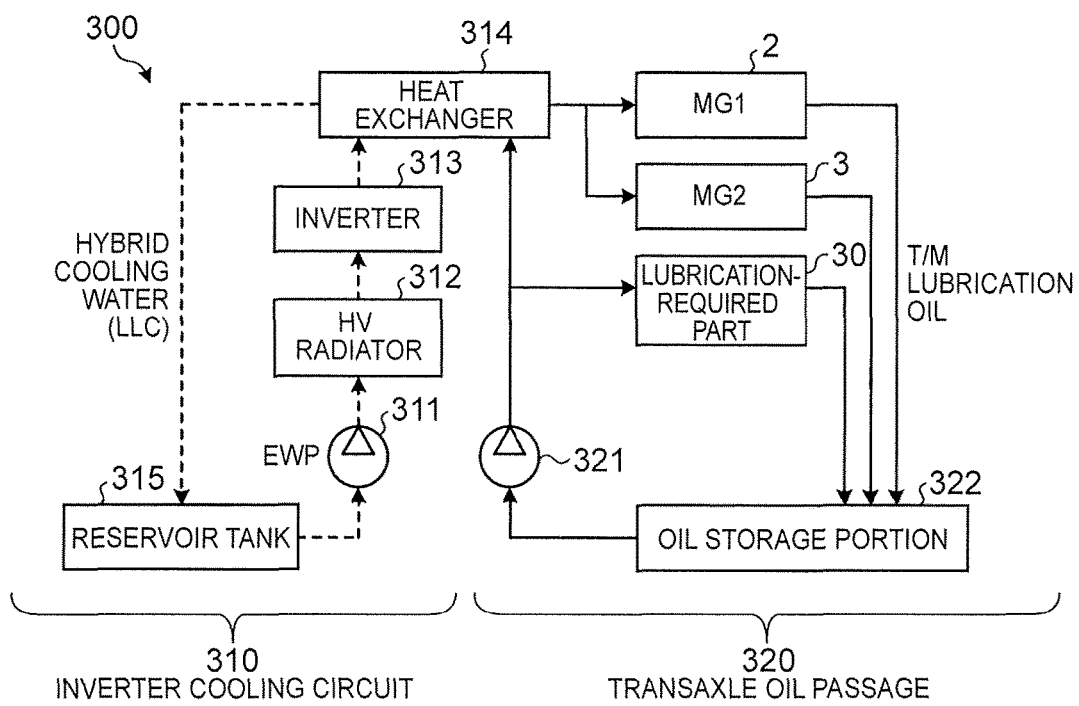
FIG. 10 is a schematic diagram illustrating a schematic configuration of a cooling system according to a reference example.

[3-1. Reference example] FIG. 10 is a schematic diagram illustrating a schematic configuration of a cooling system 300 according to a reference example. In the cooling system 300 according to the reference example, an inverter cooling circuit 310 and a transaxle oil passage 320 are formed by respective independent flow passages. The inverter cooling circuit 310 is formed by a water passage in which hybrid cooling water (LLC) is circulated as a coolant. The transaxle oil passage 320 is formed by an oil passage in which a transmission lubricating oil (T/M lubricating oil) is circulated as a coolant.

More specifically, the inverter cooling circuit 310 includes an electric water pump (EWP) 311, an HV radiator 312 that performs heat exchange between hybrid cooling water (hereinafter referred to as "HV cooling water") and air, an inverter 313 electrically connected to respective motors 2, 3, a heat exchanger 314 that performs heat exchange between the HV cooling water and oil in the transaxle oil passage 320, and a reservoir tank 315 that stores the HV cooling water. The inverter cooling circuit 310 is a circulation water passage for cooling the inverter 313 using the HV cooling water.

In the inverter cooling circuit 310, the electric water pump 311 sucks in the HV cooling water stored in the reservoir tank 315 and discharges the HV cooling water from a discharge port. The HV cooling water discharged from the electric water pump 311 is air-cooled by the HV radiator 312 and then supplied to the inverter 313. The inverter 313 is cooled by the HV cooling water air-cooled by the HV radiator 312. After cooling the inverter 313, the HV cooling water flows into the heat exchanger 314 and performs heat exchange with the oil and then is pumped to the reservoir tank 315.

The transaxle oil passage 320 includes a mechanical oil pump 321, the heat exchanger 314, the first motor 2, the second motor 3, a lubrication-required part 30 and an oil storage portion 322. The transaxle oil passage 320 includes an oil passage (cooling oil passage) that enables heat exchange between oil discharged from the mechanical oil pump 321 and the HV cooling water by means of the heat exchanger 314 and then the oil to be supplied to the respective motors 2, 3. Also, the transaxle oil passage 320 includes an oil passage (lubricating oil passage) that enables oil discharged from the mechanical oil pump 321 to be supplied to the lubrication-required part 30 without performing heat exchange with the HV cooling water by means of the heat exchanger 314. Here, unlike the oil storage portion 104 according to the above-described first embodiment, oil stored in the oil storage portion 322 is oil that is not to be supplied to the HV radiator 312 and the inverter 313.

[3-2. Comparison] The cooling system 100 according to the first embodiment is advantageous over the cooling system 300 according to the reference example in, first, cooling performance, and second, structure.

[3-2-1. Cooling performance] Attention will be focused on cooling performance for the inverter. A point in common to the first embodiment and the reference example is that inside the inverter 21 or 313, an inverter element energized with electricity is a heat generating part (heat source).

In the inverter cooling circuit 310 according to the reference example, HV cooling water, which is a coolant, has electrical conductivity, and thus, in consideration of safety, the HV cooling water cannot be brought into contact with the inverter element (inverter heat generating part) energized with electricity. In heat exchange between the inverter heat generating part and the HV cooling water, it is necessary to provide an insulating plate (intervening member) such as a heat sink between the inverter heat generating part and the HV cooling water. Thus, cooling of the inverter heat generating part by the HV cooling water is indirect cooling via an insulating plate, and thus, thermal resistance of a part between the HV cooling water and the inverter heat generating part increases by the amount of the insulating plate. For example, if a heat transfer member is provided on a heat transfer path from the inverter element to the insulating plate (heat sink), thermal resistance increases by the amount of the heat transfer member. Also, a capability of releasing heat of the inverter element may be decreased not only by rates of heat transfer between members included in the heat transfer path, but also by heat conductivities of the members themselves.

In the cooling system 100 according to the first embodiment, the oil, which is a coolant, has an insulating property, and thus, when the oil cools the inverter 21, the oil can be brought into contact with the inverter element (inverter heat generating part) energized with electricity. In the cooling system 100, direct heat exchange can be performed between the inverter heat generating part and the oil (coolant). In other words, the cooling system 100 enables the inverter element to be directly cooled by the coolant having an insulating property. Consequently, unlike the reference example, the cooling system 100 needs no insulating plate such as a heat sink, enabling reduction in thermal resistance between the coolant (oil) and the inverter heat generating part compared to the reference example. Therefore, the first embodiment provides enhancement in capability of cooling the inverter element compared to the reference example and thus enhancement in cooling performance for the inverter 21. In addition, the enhancement in capability of cooling the inverter element results in enhancement in heat resistance performance of the inverter 21. Here, the inverter element is a package covered by a casing.

Also, the cooling system 300 according to the reference example is configured in such a manner that oil is pumped to both the motors 2, 3 (cooling-required part) and the lubrication-required part 30 by one mechanical oil pump 321. Thus, it is difficult to control the amount of oil supplied to the cooling-required part and the amount of oil supplied to the lubrication-required part 30. For example, in the case of the vehicle requiring oil warming of the lubrication-required part 30 (warming is emphasized) such as a cold-start of the vehicle Ve, despite the mechanical oil pump 321 being driven in order to supply oil to the lubrication-required part 30, a part of the oil is supplied to the cooling-required part (motors 2, 3). This may result in reduction in amount of oil supplied for warming. In this case, oil is supplied to the cooling-required part that less requires cooling. This may result in increase in loss caused as a result of the oil being stirred by the rotating rotors of the respective motors 2, 3 (stirring loss) and loss caused by the rotors being dragged by the oil (dragging loss). Or, where the vehicle requires cooling of at least one of the first motor 2 and the second motor 3 (cooling is emphasized), despite the mechanical oil pump 321 being driven in order to supply oil to the cooling-required part (motors 2, 3) as a coolant, a part of the oil is supplied to the lubrication-required part 30. This results in reduction in amount of oil supplied as a coolant, which may decrease the capability of cooling the motors 2, 3. In addition, an excessive amount of the oil may be supplied to the lubrication-required part 30, resulting in an increase in the stirring loss and the dragging loss caused in the lubrication-required part 30. As described above, an increase in the stirring loss and the dragging loss in motor components (respective motors 2, 3) and lubrication components (lubrication-required part 30) due to the oil may cause fuel efficiency deterioration.

Furthermore, in the cooling system 300 according to the reference example, the oil in the transaxle oil passage 320 releases heat to the HV cooling water in the inverter cooling circuit 310 via the heat exchanger 314. In other words, the HV cooling water is air-cooled by the HV radiator 312, that is, heat of the oil is released in the HV radiator 312 via the HV cooling water. Thus, a heat release efficiency of the oil is not good. This may reduce the effect of cooling the respective motors 2, 3 by the oil.

In the first embodiment, the oil circulation circuit 200 including the cooling circuit 210 and the lubrication circuit 220 enables oil having different temperatures to be supplied to the components requiring cooling (the inverter 21 and the motors 2, 3) and the components requiring warming (the lubrication-required part 30), respectively. Also, the electric oil pump 102, which is a first oil pump, provided in the cooling circuit 210, and the mechanical oil pump 101, which is a second oil pump, provided in the lubrication circuit 220 can be driven separately. For example, in the cases where the vehicle Ve requires cooling of the motors 2, 3 such as cases where the vehicle Ve moves at high speed or moves on an uphill road (cooling is emphasized), the electric oil pump 102 can be driven under the control of the control unit 150. Consequently, the cooling system 100 can ensure both cooling performance and lubrication performance.

Also, in the cooling system 100 according to the first embodiment, the electric oil pump 102 is intended to supply oil to the inverter 21 and the motors 2, 3 in the cooling circuit 210, and can be controlled by the control unit 150. Thus, the electric oil pump 102 enables oil temperature control in consideration of inverter temperature and motor temperature. On the other hand, in the reference example, the electric water pump 311 for the inverter cooling circuit 310 and the mechanical oil pump 321 for the transaxle oil passage 320 are provided, and thus, an inverter temperature and motor temperatures are controlled separately. Therefore, according to the first embodiment, control can more easily be performed to provide optimum oil temperatures according to the moving state of the vehicle Ve, compared to the reference example.

[3-2-2. Structure] Also, regarding the structure, the first embodiment enables reduction in number of components compared to the reference example. For example, the heat exchanger 314, the reservoir tank 315 and a part of a tubing included in the water passage in the reference example can be omitted. Furthermore, the first embodiment does not need HV cooling water, which is a component dedicated for the inverter cooling circuit 310 in the reference example, and thus enables omission of one coolant. In brief, the cooling system 100 according to the first embodiment needs only one coolant (oil only), and thus eliminates the need to provide overlapping components, enabling provision of a small and light system configuration. Furthermore, omission of components (including HV cooling water) enables reduction in cost. In addition, the large-size cooling system 300 is poor in vehicle installation capability, which results in assemblability deterioration.

Figure 3:
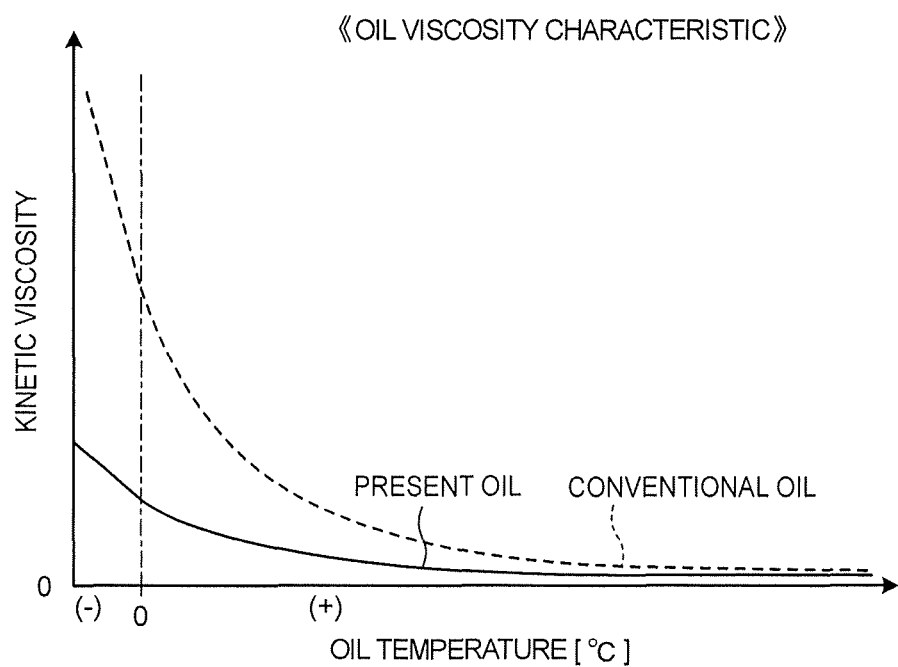
FIG. 3 is a diagram for describing a comparison between a kinetic viscosity of oil used in the cooling system according to the first embodiment and a kinetic viscosity of conventional oil.
Figure 4:
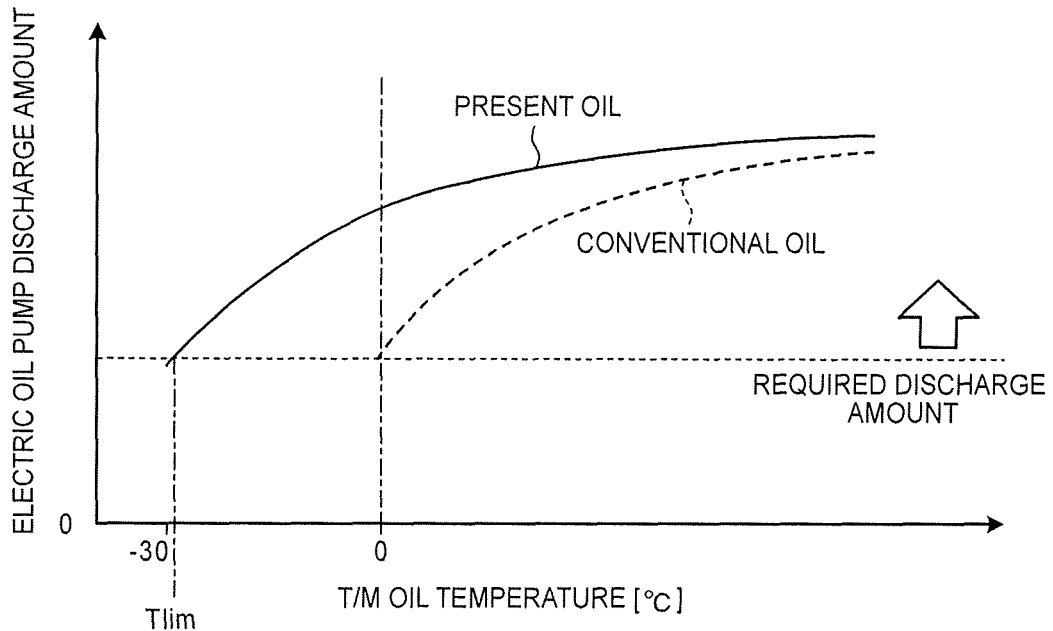
FIG. 4 is a diagram for describing a relationship between a pump discharge amount and an oil temperature.

[3-2-3. Oil fluidity] Fluidity of the oil will be described with reference to FIGS. 3 and 4. FIG. 3 is a diagram for describing a comparison between a kinetic viscosity of the oil used in the cooling system 100 according to the first embodiment and a kinetic viscosity of conventional oil. FIG. 4 is a diagram for describing a relationship between a pump charge amount and an oil temperature. In this description, the oil used in the cooling system 100 is referred to as "the present oil", and oil used in a conventional cooling system is referred to as "conventional oil". Also, the solid line indicated in FIG. 3 represents a kinetic viscosity of the present oil, and the dashed line represents a kinetic viscosity of the conventional oil. The solid line indicated in FIG. 4 represents a discharge amount (flow amount) with the present oil, and the dashed line represents a discharge amount (flow amount) with conventional oil.

As illustrated in FIG. 3, the kinetic viscosity of the present oil is low compared to the kinetic viscosity of the conventional oil at any oil temperature, and in particular, largely decreases in a low-temperature range. More specifically, in an oil temperature range in which the oil temperature is negative, the viscosity of the present oil substantially decreases compared to the conventional oil. In an oil temperature range in which the oil temperature is positive, the present oil exhibits a large viscosity decrease. For example, in an oil temperature range of approximately 10 to 30° C., the present oil exhibits a 60% kinetic viscosity decrease relative to the conventional oil.

Thus, use of the present oil, which is a low viscosity oil, in the cooling system 100 enables reduction in pressure loss caused when the present oil flows in the oil circulation circuit 200. Consequently, the present oil can be made to flow inside the inverter 21 as a coolant while an increase in pressure loss being suppressed. Also, a dragging resistance caused by the oil is deceased in rotary members such as the rotors of the respective motors 2, 3 and the lubrication-required part 30 that are in contact with the oil. Consequently, an oil temperature range in which the electric oil pump 102 is operable can be expanded to an extremely low temperature range. In other words, an operation limit oil temperature of the electric oil pump 102 is lowered to an extremely low temperature. The operation limit oil temperature is an oil temperature at which an amount of discharge from an electric oil pump 102 (flow amount per unit time) reaches a required discharge amount. FIG. 4 indicates a difference between the present oil and the conventional oil in terms of operation limit oil temperature for the electric oil pump 102.

As illustrated in FIG. 4, an operation limit oil temperature Tlim for the electric oil pump 102 that discharges the present oil is an extremely low temperature of minus several tens degrees centigrade. The operation limit oil temperature Tlim for the electric oil pump 102 may be approximately −40° C. to −20° C. On the other hand, the operation limit oil temperature of the electric oil pump 102 that discharges the conventional oil is around zero degrees centigrade. As described above, the oil temperature range in which the electric oil pump 102 is operable expands to an extremely low temperature range including minus several tens degrees centigrade. Thus, fluidity of the present oil is ensured even if an ambient temperature is an extremely low temperature of around minus 30° C. Also, the discharge amount when the present oil is used is large compared to the discharge amount when the conventional oil is used, at any oil temperature, and, in particular exhibits a substantial increase at a low temperature range.

As described above, the cooling system 100 according to the first embodiment includes the oil circulation circuit 200 in which only oil is circulated through the inverter oil passage and the transaxle oil passage. Consequently, the cooling system 100 can be downsized. In the oil circulation circuit 200, oil air-cooled by the HV radiator 103 can be supplied to the inverter 21 and the motors 2, 3 (cooling-required part) by the cooling circuit 210, and oil not air-cooled by the HV radiator 103 can be supplied to the lubrication-required part 30 by the lubrication circuit 220. Consequently, the cooling system 100 can ensure both cooling performance and lubrication performance. Also, the oil can be cooled (air-cooled) by the HV radiator 103, and thus, coolability of the oil is enhanced. In addition, the air-cooled oil is supplied to the respective motors 2, 3, and thus, the capability of cooling the motors 2, 3 is enhanced. Also, in the cooling circuit 210, the inverter 21 and either of the motors 2, 3 are arranged in series. Consequently, reduction in amount of oil supplied to the motors 2, 3 can be suppressed.

Also, the enhancement in coolability of the oil enables reduction in loss (copper loss and iron loss) in the respective motors 2, 3, which results in enhancement in fuel efficiency and heat resistance of the respective motors 2, 3. Also, the capability of cooling the inverter 21 is also enhanced, and thus, enables reduction in loss (e.g., copper loss) in the inverter 21, which results in enhancement in fuel efficiency and heat resistance of the inverter 21.

Figure 5:
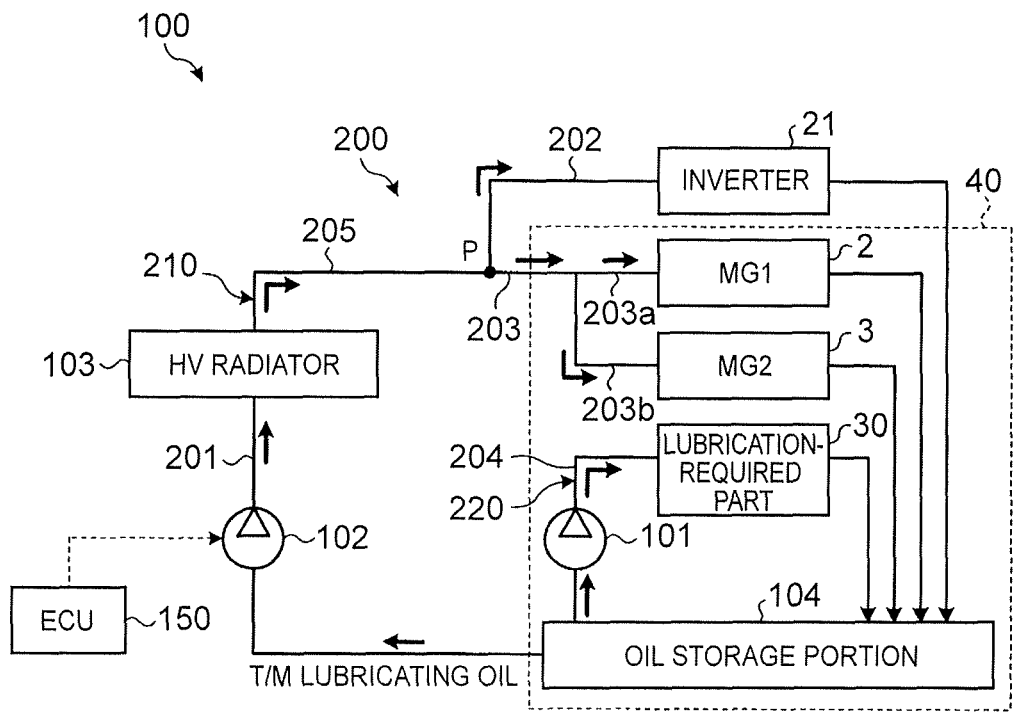
FIG. 5 is a schematic diagram illustrating a schematic configuration of a cooling system according to an modification.

[4. Modification] FIG. 5 is a schematic diagram illustrating a schematic configuration of a cooling system 100 according to a modification. In the description of the modification, components similar to those of the above-described first embodiment are provided with reference numerals that are the same as those of the above-described first embodiment and description thereof will be omitted.

As illustrated in FIG. 5, in the cooling system 100 according to the modification, an inverter 21 and respective motors 2, 3 are connected in parallel on the downstream side of an electric oil pump 102 in a cooling circuit 210 of the oil circulation circuit 200. More specifically, the inverter 21, the first motor 2 and the second motor 3 are arranged in parallel in the cooling circuit 210.

More specifically, a post-cooling oil passage 205 is connected to an exit of an HV radiator 103. An oil passage on the downstream side of the post-cooling oil passage 205 forks at a fork point P. At the fork point P, the post-cooling oil passage 205, a first supply oil passage 202 and a second supply oil passage 203 (an MG1 cooling pipe 203a and an MG2 cooling pipe 203b) are in communication with one another. In other words, an oil passage in an inner portion of a case of the inverter 21 communicates with the HV radiator 103 via the first supply oil passage 202 and the post-cooling oil passage 205. The MG1 cooling pipe 203a of the first motor 2 communicates with the HV radiator 103 via the post-cooling oil passage 205. The MG2 cooling pipe 203b of the second motor 3 communicates with the HV radiator 103 via the post-cooling oil passage 205. In other words, the cooling circuit 210 according to the modification is configured such that the oil to be supplied to the motors 2, 3 temporarily flows outside the transaxle case 40 in order to pass through the HV radiator 103 without passing through the inverter 21.

The cooling system 100 according to the modification can supply oil air-cooled by the HV radiator 103 to the respective motors 2, 3 without passing through the inverter 21. Consequently, increase in temperature of the oil supplied to the respective motors 2, 3 is prevented by cooling of the inverter 21, enabling the respective motors 2, 3 to be cooled by the low-temperature oil. Therefore, the capability of cooling the respective motors 2, 3 is enhanced.

Here, the case where the inverter 21 and the respective motors 2, 3 are arranged in series as in the above described first embodiment and the case where the inverter 21 and the respective motors 2, 3 are arranged in parallel as in the modification will be compared. Where the inverter 21 and the respective motors 2, 3 are arranged in series in the cooling circuit 210, the amount of oil supplied to the respective motors 2, 3 is large and the temperature of the oil is high compared to the case where the inverter 21 and the motors 2, 3 are arranged in parallel. Where the inverter 21 and the respective motors 2, 3 are arranged in parallel in the cooling circuit 210, the amount of oil supplied to the respective motors 2, 3 is small and the temperature of the oil is low compared to the case where the inverter 21 and the respective motors 2, 3 are arranged in series.

Note that the vehicular cooling system according to the present disclosure is not limited to the first embodiment and modification described above, and arbitrary changes are possible without departing from the object of the present disclosure.

For example, the structure and arrangement of the mechanical oil pump 101 are not specifically limited as long as the structure and arrangement are those that can be formed inside the transaxle case 40. For example, it is possible that the mechanical oil pump 101 is not disposed coaxially with the crankshaft of the engine 1. In this case, the mechanical oil pump 101 and the input shaft 6 are connected via a mechanism such as a gear mechanism or a chain mechanism so as to enable power transmission.

Also, types of two oil pumps included in the cooling system 100 are not limited to those of the above-described first embodiment. In other words, the first oil pump included in the cooling circuit 210 is not limited to the electric oil pump 102, and the second oil pump included in the lubrication circuit 220 is not limited to the mechanical oil pump 101. For example, the first oil pump and the second oil pump may be both electric oil pumps. In this case, the second oil pump that pumps oil in the lubrication circuit 220 is an electric oil pump, and the second oil pump in the lubrication circuit 220 can be controlled by the control unit 150. Also, according to the cooling system 100, the second oil pump formed of an electric oil pump can be driven when the vehicle Ve stops. Furthermore, the vehicle with the cooling system 100 installed therein is not limited to a hybrid vehicle, and may be an electric vehicle (EV) using motors only as motive power sources.

Furthermore, in the cooling system 100, the number of motors included in the cooling-required part is not limited, a number of motors, the number being a number other than two, may be cooling targets. Although the first embodiment has been described in terms of a case where the vehicle Ve is a two motor-type hybrid vehicle, the vehicle may be a one motor-type hybrid vehicle. Or, the cooling system 100 may include three or more motors, which are cooling targets.

Also, the cooling system 100 may have a water cooling-type oil cooler instead of the HV radiator 103, which is an air cooling-type oil cooler. The cooling system 100 may only include an oil cooler capable of cooling oil to be supplied to the inverter 21 and the respective motors 2, 3, which are cooling targets. Thus, there is no limitation on whether the oil cooler is of the air-cooling type or the water-cooling type. For example, if the cooling system 100 has a water cooling-type oil cooler, the water cooling-type oil cooler may be a heat exchanger that performs heat exchange between oil flowing in the cooling circuit 210 and engine cooling water.

Also, the lubrication-required part 30 may include the differential gear mechanism 9. In other words, there is no specific limitation on whether or not the differential gear mechanism 9 is included in the lubrication-required part 30.

Second Embodiment

Next, a cooling system 100 according to a second embodiment will be described with reference to FIGS. 6 to 9. The cooling system 100 according to the second embodiment is different from the first embodiment in including a three phase heat exchanger that causes heat exchange among engine cooling water (hereinafter referred to as "ENG cooling water"), engine oil (hereinafter referred to as "ENG oil") and T/M lubricating oil (hereinafter referred to as "T/M oil"). In the description of the second embodiment, description of components that are similar to those of the first embodiment will be omitted and for such components, the reference numerals used in the first embodiment are used.

Figure 6:
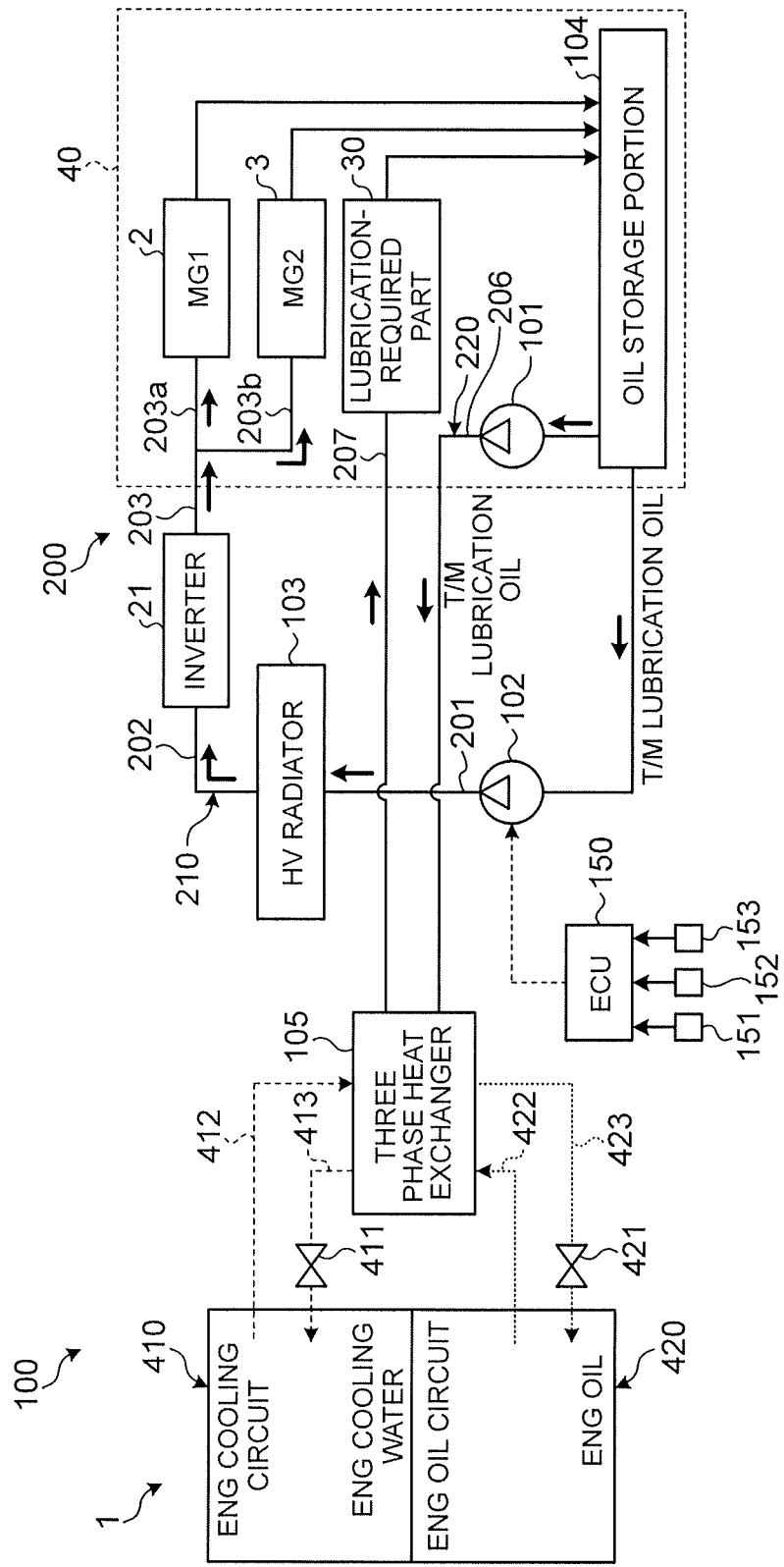
FIG. 6 is a schematic diagram illustrating a schematic configuration of a cooling system according to a second embodiment.

[5. Cooling system] FIG. 6 is a schematic diagram illustrating a schematic configuration of the cooling system 100 according to the second embodiment. As illustrated in FIG. 6, the cooling system 100 according to the second embodiment includes a three phase heat exchanger (hereinafter simply referred to as "heat exchanger") 105 that causes heat exchange among the ENG cooling water, the ENG oil and the T/M oil. Also, an oil circulation circuit 200 is configured to allow the T/M oil flowing inside a lubrication circuit 220 to flow into the heat exchanger 105 but prevent the T/M oil flowing inside a cooling circuit 210 from flowing into the heat exchanger 105. Also, the lubrication circuit 220, an ENG cooling circuit 410 and an ENG oil circuit 420 are connected to the heat exchanger 105.

[5-1. Lubrication circuit] The lubrication circuit 220 includes a mechanical oil pump 101, the heat exchanger 105, a lubrication-required part 30 and an oil storage portion 104. The lubrication circuit 220 supplies oil discharged from the mechanical oil pump 101 to the lubrication-required part 30 through the heat exchanger 105.

A second discharge oil passage 206 is connected to a discharge port of the mechanical oil pump 101. The oil discharged by the mechanical oil pump 101 into the second discharge oil passage 206 is pumped toward the heat exchanger 105 by means of a discharge pressure of the mechanical oil pump 101 in the lubrication circuit 220, and further to the lubrication-required part 30 through the heat exchanger 105.

The heat exchanger 105 is a heat exchanger configured to allow heat exchange between the respective three liquids that are the T/M oil, the ENG cooling water and the ENG oil. In other words, the heat exchanger 105 is configured to allow heat exchange between the T/M oil and the ENG cooling water and allow heat exchange between the T/M oil and the ENG oil. Also, the heat exchanger 105 is configured to allow heat exchange between ENG cooling water and ENG oil. The second discharge oil passage 206 is connected to an entrance of the heat exchanger 105 in the lubrication circuit 220. A fourth supply oil passage 207 is connected to an exit of the heat exchanger 105 in the lubrication circuit 220. The fourth supply oil passage 207 is a lubricating oil passage that supplies the oil to the lubrication-required part 30 on the downstream side of the heat exchanger 105.

Also, in the lubrication circuit 220, a first oil temperature sensor 151 that detects a temperature Ttm of the T/M oil is provided. For example, the first oil temperature sensor 151, which is provided in the second discharge oil passage 206 in the lubrication circuit 220, detects a temperature Ttm of the T/M oil discharged from the mechanical oil pump 101. Then, the temperature Ttm of the T/M oil (hereinafter referred to as "T/M oil temperature") detected by the first oil temperature sensor 151 is input to a control unit 150 as a detection signal (temperature information).

[5-2. ENG cooling circuit] The ENG cooling circuit 410 is a circuit in which the ENG cooling water circulates. As illustrated in FIG. 6, the ENG cooling circuit 410 includes the heat exchanger 105, and a first switching valve (ON-OFF valve) 411 that selectively shuts off a flow of the ENG cooling water returning to an engine 1 through the heat exchanger 105. Also, the ENG cooling circuit 410 includes known components such as a water pump (not illustrated).

A first water passage 412 that supplies the ENG cooling water to the heat exchanger 105 is connected to a cooling water exit of the engine 1 and to a cooling water entrance of the heat exchanger 105. Also, a second water passage 413 that supplies the ENG cooling water subjected to heat exchange by the heat exchanger 105 to the engine 1 is connected to a cooling water exit of the heat exchanger 105 and to a cooling water entrance of the engine 1. In the example illustrated in FIG. 6, a first switching valve 411 is provided in the second water passage 413.

The first switching valve 411 switches between an open state (ON) in which a flow of the ENG cooling water returning to the engine 1 through the heat exchanger 105 is allowed and a closed state (OFF) in which a flow of ENG cooling water returning to the engine 1 through the heat exchanger 105 is not allowed. The first switching valve 411 is formed of, for example, an electromagnetic valve, and opening-closing of the first switching valve 411 is controlled by the control unit 150. If the first switching valve 411 is in the open state, the ENG cooling water flows in the first water passage 412 from the engine 1 toward the heat exchanger 105 and the ENG cooling water flows in the second water passage 413 from the heat exchanger 105 toward the engine 1. On the other hand, if the first switching valve 411 is in the closed state, in the ENG cooling circuit 410, no flow of the ENG cooling water returning to the engine 1 through the heat exchanger 105 occurs.

Also, in the ENG cooling circuit 410, a water temperature sensor 152 that detects a temperature (hereinafter referred to as "ENG cooling water temperature") Thw of the ENG cooling water is provided. The water temperature sensor 152 is installed on the upstream side of the heat exchanger 105 in the ENG oil circuit 420. Also, information on the ENG cooling water temperature Thw detected by the water temperature sensor 152 is input to the control unit 150 as a detection signal.

[5-3. ENG oil circuit] The ENG oil circuit 420 is a circuit in which the ENG oil circulates. As illustrated in FIG. 6, the ENG oil circuit 420 includes the heat exchanger 105, and a second switching valve (ON-OFF valve) 421 that selectively shuts off a flow of the ENG oil returning to the engine 1 through the heat exchanger 105.

A first oil passage 422 that supplies the ENG oil to the heat exchanger 105 is connected to an ENG oil exit of the engine 1 and to an ENG oil entrance of the heat exchanger 105. Also, a second oil passage 423 that supplies the ENG oil subjected to heat exchange in the heat exchanger 105 to the engine 1 is connected to an ENG oil exit of the heat exchanger 105 and to an ENG oil entrance of the engine 1. In the example illustrated in FIG. 6, the second switching valve 421 is provided in the second oil passage 423.

The second switching valve 421 switches between an open state (ON) in which a flow of the ENG oil returning to the engine 1 through the heat exchanger 105 is allowed and a closed state (OFF) in which a flow of the ENG oil returning to the engine 1 through the heat exchanger 105 is not allowed. The second switching valve 421 is formed of, for example, an electromagnetic valve, and opening-closing of the second switching valve 421 is controlled by the control unit 150. If the second switching valve 421 is in the open state, the ENG oil flows in the first oil passage 422 from the engine 1 toward the heat exchanger 105, and the ENG oil flows inside the second oil passage 423 from the heat exchanger 105 toward the engine 1. On the other hand, if the second switching valve 421 is in the closed state, in the ENG oil circuit 420, no flow of the ENG oil returning to the engine 1 through the heat exchanger 105 occurs.

Also, in the ENG oil circuit 420, a second oil temperature sensor 153 that detects a temperature (hereinafter referred to as "ENG oil temperature") Toil of the ENG oil is provided. The second oil temperature sensor 153 is installed on the upstream side relative to the heat exchanger 105 in the ENG oil circuit 420. Information on the ENG oil temperature Toil detected by the second oil temperature sensor 153 is input to the control unit 150 as a detection signal.

[6. Control unit] The control unit 150 controls opening-closing of the first switching valve 411 and the second switching valve 421, based on the detection signals (the T/M oil temperature Ttm, the ENG cooling water temperature Thw and the ENG oil temperature Toil) input from the respective sensors 151 to 153. In other words, the control unit 150 performs switching control to switch each of the first switching valve 411 and the second switching valve 421 between the open state and the closed state and thereby controls a heat exchange state in the heat exchanger 105. More specifically, the control unit 150 performs comparison among the T/M oil temperature Ttm, a predetermined oil temperature $Ttm_{-1}$ for the T/M oil temperature Ttm, the ENG cooling water temperature Thw, a predetermined water temperature $Thw_{-1}$ for the ENG cooling water temperature Thw, and the ENG oil temperature Toil to perform the switching control.

The predetermined oil temperature $Ttm_{-1}$ is a value set in consideration of T/M unit loss. A T/M unit includes drive devices housed in a transaxle case 40 (a first motor 2, a second motor 3 and a power transmission mechanism) and electric components (e.g., an inverter 21) connected to the motors 2, 3. Thus, the TM unit loss includes loss caused in the power transmission mechanism (for example, loss caused due to oil dragging loss in the lubrication-required part 30) in addition to iron loss and copper loss caused when the motors 2, 3 are driven. Furthermore, the T/M unit loss has a characteristic of the amount of the T/M unit loss varying as the T/M oil temperature Ttm varies (temperature characteristic).

Figure 7:
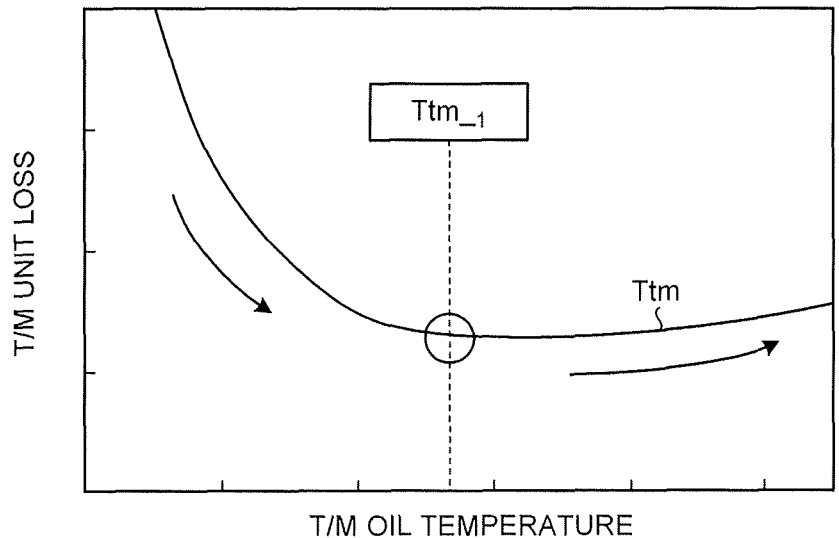
FIG. 7 is a diagram for describing a relationship between T/M unit loss and a T/M oil temperature.

FIG. 7 is a diagram for describing a relationship between the T/M unit loss and the T/M oil temperature Ttm. As illustrated in FIG. 7, if the T/M oil temperature Ttm falls within an oil temperature range that is lower than the predetermined oil temperature $Ttm_{-1}$, the T/M unit loss continuously decreases as the T/M oil temperature Ttm increases over time. Conversely, if the T/M oil temperature Ttm falls within an oil temperature range that is higher than the predetermined oil temperature $Ttm_{-1}$, the T/M unit loss continuously increases as the oil temperature increases over time. Thus, the amount of the T/M unit loss attributable to the T/M oil temperature Ttm is a minimal value at the predetermined oil temperature $Ttm_{-1}$. This is because the T/M unit loss can be divided into friction loss and motor loss and the friction loss decreases upon an oil temperature increase and the motor loss increases upon an oil temperature increase. Therefore, the control unit 150 performs switching control for each of the switching valves 411, 421 (control for heat exchange in the heat exchanger 105) using the predetermined oil temperature $Ttm_{-1}$ for the T/M oil temperature Ttm as a threshold value.

Figure 8:
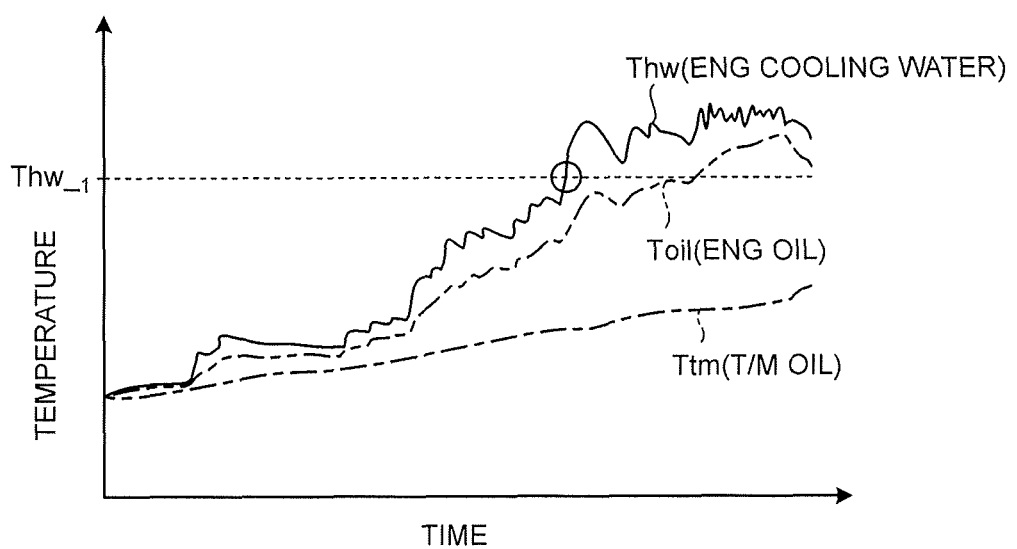
FIG. 8 is a diagram illustrating liquid temperature changes in a normal moving state.

FIG. 8 is a diagram illustrating liquid temperature changes in a normal moving state. The normal moving state refers to a state in which a vehicle is moving by means of motive power of the engine 1. As illustrated in FIG. 8, if a vehicle Ve is in a normal moving state, the liquid temperatures are in a relationship of "T/M oil temperature Ttm<ENG oil temperature Toil<ENG cooling water temperature Thw". Also, upon an increase of the ENG cooling water temperature Thw to be equal to or exceed the predetermined water temperature $Thw_{-1}$, all fuel consumption control for the engine 1 (hereinafter referred to as "ENG fuel consumption control") is performed. In other words, the predetermined water temperature $Thw_{-1}$ is a threshold value. The ENG fuel consumption control is control performed for fuel efficiency enhancement. The ENG fuel consumption control includes, for example, control to automatically stop the engine 1 when the vehicle makes a brief stop, control to set operating points of the engine 1 (an engine speed and an engine torque) on an optimum fuel consumption line on which a best efficiency is achieved, and EV moving control to permit EV moving in which the vehicle moves by means of motive power of the motors 2, 3. Also, although not illustrated in FIG. 8, in a high-load moving state, the ENG oil temperature Toil is higher than the T/M oil temperature Ttm and the ENG cooling water temperature Thw. For example, after continuation of the normal moving state indicated in FIG. 8 for a long time (for example, several hours), the vehicle enters a high-load moving state. Here, examples of the normal moving state include HV moving in which the vehicle moves by means of motive power of the engine 1 and the respective motors 2, 3 and engine moving in which the vehicle moves by means of motive power of the engine 1 alone.

Figure 9:
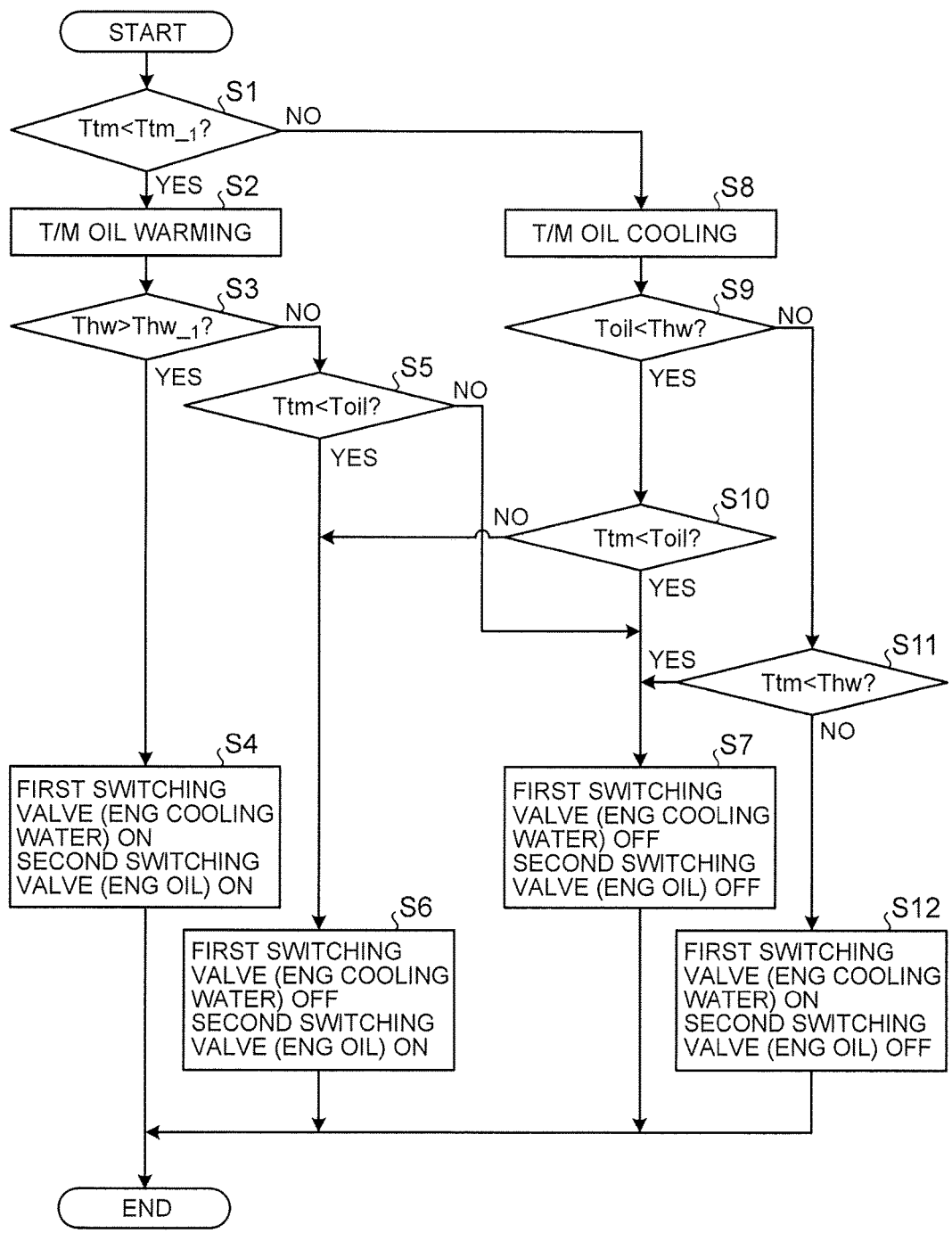
FIG. 9 is a flowchart illustrating an example of a heat exchange control flow in the second embodiment.

[7. Heat exchange control] FIG. 9 is a flowchart illustrating an example of heat exchange control. The control routine indicated in FIG. 9 is performed by the control unit 150.

As illustrated in FIG. 9, the control unit 150 determines whether or not the T/M oil temperature Ttm is lower than the predetermined oil temperature $Ttm_{-1}$ (step S1). The predetermined oil temperature $Ttm_{-1}$ is a threshold value set in advance.

If an affirmative determination that the T/M oil temperature Ttm is lower than the predetermined oil temperature $Ttm_{-1}$ is made in step S1 (step S1: Yes), the control unit 150 performs warming control to control heat exchange in heat exchanger 105 to warm the T/M oil (step S2). In this case, the control unit 150 determines whether or not the ENG cooling water temperature Thw is higher than the predetermined water temperature $Thw_{-1}$ (step S3). The predetermined water temperature $Thw_{-1}$ is a threshold value set in advance.

If an affirmative determination is made in step S3 because of the ENG cooling water temperature Thw being higher than the predetermined water temperature $Thw_{-1}$ (step S3: Yes), the control unit 150 controls the first switching valve 411 to be ON and the second switching valve 421 to be ON (step S4). Upon performance of step S4, the first switching valve 411 and the second switching valve 421 are opened, heat exchange is performed between the T/M oil and the ENG cooling water, and heat exchange is performed between the T/M oil and the ENG oil. After the performance of step S4, the control unit 150 ends the control routine.

As described above, if the affirmative determination is made in step S3, as illustrated in FIG. 8 mentioned above, the ENG cooling water temperature Thw and the ENG oil temperature Toil are in a state in which the ENG cooling water temperature Thw and the ENG oil temperature Toil are higher than the T/M oil temperature Ttm. Then, upon performance of step S4, heat of the ENG cooling water and the ENG oil is transferred to the T/M oil and the T/M oil is thereby warmed. Therefore, the T/M oil can quickly be warmed by the heat of the ENG cooling water and the heat of the ENG oil. Consequently, the lubrication-required part 30 can quickly be warmed by the T/M oil that has passed through the heat exchanger 105.

If a negative determination is made in step S3 because of the ENG cooling water temperature Thw being equal to or below the predetermined water temperature $Thw_{-1}$ (step S3: No), the control unit 150 determines whether or not the T/M oil temperature Ttm is lower than the ENG oil temperature Toil (step S5).

If an affirmative determination is made in step S5 because of the T/M oil temperature Ttm being lower than the ENG oil temperature Toil (step S5: Yes), the control unit 150 controls the first switching valve 411 to be OFF and the second switching valve 421 to be ON (step S6). Upon performance of step S6, the second switching valve 421 is opened, heat exchange is thus performed between the T/M oil and the ENG oil, but the first switching valve 411 is closed, no heat exchange is thus performed between the T/M oil and the ENG cooling water. After the performance of step S6, the control unit 150 ends the control routine.

As described above, if step S6 is performed after determination in step S5, the T/M oil temperature Ttm is in a state in which T/M oil temperature Ttm is lower than the ENG oil temperature Toil, heat of the ENG oil is transferred to the T/M oil in the heat exchanger 105, and the T/M oil is thereby warmed. Therefore, the T/M oil can quickly be warmed by the heat of the ENG oil. Consequently, the lubrication-required part 30 can quickly be warmed by the T/M oil that has passed through the heat exchanger 105. Furthermore, if step S6 is performed after determination in step S5, the ENG cooling water provides no heat to the T/M oil, and thus, the ENG cooling water is preferentially warmed until the ENG cooling water temperature Thw increases to the predetermined water temperature $Thw_{-1}$. Consequently, the engine 1 is warmed by the ENG cooling water.

If a negative determination is made in step S5 because of the T/M oil temperature Ttm being equal to or exceeding the ENG oil temperature Toil (step S5: No), the control unit 150 controls the first switching valve 411 and the second switching valve 421 to be OFF (step S7). Upon performance of step S7, the first switching valve 411 and the second switching valve 421 are closed, no heat exchange is thus performed between the T/M oil and the ENG cooling water, and also between the T/M oil and the ENG oil. In other words, the T/M oil receives no heat from the ENG cooling water and the ENG oil. After the performance of step S7, the control unit 150 ends the control routine.

As described above, if step S7 is performed after determination in step S5, the T/M oil temperature Ttm is in a state in which the T/M oil temperature Ttm is higher than the ENG oil temperature Toil, and thus, transfer of heat of the T/M oil to the ENG oil can be prevented by closing the second switching valve 421. Consequently, when the T/M oil is warmed, the heat of the T/M oil can be prevented from being taken by the ENG oil. Thus, the lubrication-required part 30 can quickly be warmed by the T/M oil that has passed through the heat exchanger 105.

On the other hand, if a negative determination is made in step S1 because of the T/M oil temperature Ttm being equal to or exceeding the predetermined oil temperature $Ttm_{-1}$ (step S1: No), the control unit 150 performs cooling control to control a heat exchange state in the heat exchanger 105 to cool the T/M oil (step S8). In this case, the control unit 150 determines whether or not the ENG oil temperature Toil is lower than the ENG cooling water temperature Thw (step S9).

An affirmative determination is made in step S9 because of the ENG oil temperature Toil being lower than the ENG cooling water temperature Thw (step S9: Yes), the control unit 150 determines whether or not the T/M oil temperature Ttm is lower than the ENG oil temperature Toil (step S10).

If an affirmative determination is made in step S10 because of the T/M oil temperature Ttm being lower than the ENG oil temperature Toil (step S10: Yes), the control unit 150 performs step S7 described above to control the first switching valve 411 and the second switching valve 421 to be OFF.

As described above, if step S7 is performed after determination in step S10, the T/M oil temperature Ttm is in a state in which the T/M oil temperature Ttm is lower than the ENG cooling water temperature Thw and the ENG oil temperature Toil, both transfer of heat of the ENG cooling water to the T/M oil and transfer of heat of the ENG oil to the T/M oil can thus be prevented by closing the first switching valve 411 and the second switching valve 421. Consequently, when the T/M oil is cooled, the T/M oil can be prevented from being warmed by the ENG cooling water and the ENG oil, ensuring coolability of the T/M oil.

If a negative determination is made in step S10 because of the T/M oil temperature Ttm being equal to or exceeding the ENG oil temperature Toil (step S10: No), the control unit 150 performs step S6 described above to control the first switching valve 411 to be OFF and the second switching valve 421 to be ON.

As described above, if step S6 is performed after determination in step S10, the T/M oil temperature Ttm is in a state in which the T/M oil temperature Ttm is higher than the ENG oil temperature Toil, and thus, transfer of heat of the ENG cooling water to the T/M oil can be prevented by closing the first switching valve 411, and heat of the T/M oil can be transferred to the ENG oil by opening the second switching valve 421. Consequently, when the T/M oil is cooled, the T/M oil can be prevented from being warmed by the ENG cooling water and the T/M oil can be cooled by the ENG oil, ensuring coolability of the T/M oil.

If a negative determination is made in step S9 because of the ENG oil temperature Toil being equal to or exceeding the ENG cooling water temperature Thw (step S9: No), the control unit 150 determines whether or not the T/M oil temperature Ttm is lower than the ENG cooling water temperature Thw (step S11).

If an affirmative determination is made in step S11 because of the T/M oil temperature Ttm being lower than the ENG cooling water temperature Thw (step S11: Yes), the control unit 150 performs step S7 described above to control the first switching valve 411 and the second switching valve 421 to be OFF.

As described above, if step S7 is performed after determination in step S11, a relationship of "T/M oil temperature Ttm<ENG cooling water temperature Thw≤ENG oil temperature Toil" is established among temperatures of the respective liquids. Thus, both transfer of heat of the ENG cooling water to the T/M oil and transfer of heat of the ENG oil to the T/M oil can be prevented by closing the first switching valve 411 and the second switching valve 421. Consequently, when the T/M oil is cooled, the T/M oil can be prevented from being warmed by the ENG cooling water and the ENG oil, ensuring coolability of the T/M oil.

If a negative determination is made in step S11 because of the T/M oil temperature Ttm being equal to or exceeding the ENG cooling water temperature Thw (step S11: No), the control unit 150 controls the first switching valve 411 to be ON and the second switching valve 421 to be OFF (step S12). Upon performance of step S12, the first switching valve 411 is opened, heat exchange is thus performed between the T/M oil and the ENG cooling water, but the second switching valve 421 is closed, no heat exchange is thus performed between the T/M oil and the ENG oil. After the performance of step S12, the control unit 150 ends the control routine.

As described above, if a negative determination is made in step S11, the T/M oil temperature Ttm is in a state in which the T/M oil temperature Ttm is higher than the ENG cooling water temperature Thw, and thus heat of the T/M oil can be transferred to the ENG cooling water by opening the first switching valve 411, and transfer of heat of the ENG oil to the T/M oil can be prevented by closing the second switching valve 421. Consequently, when the T/M oil is cooled, the T/M oil can be cooled by releasing heat to the ENG cooling water and the T/M oil can be prevented from being warmed by the ENG oil, ensuring coolability of the T/M oil.

[8. Comparison with reference example] Here, for description of advantages of the cooling system 100 according to the second embodiment, the cooling system 100 and a reference example will be compared with reference to FIG. 11. Here, for a cooling system 500, which is illustrated in FIG. 11, description of components that are similar to those of the cooling system 300 illustrated in FIG. 10 described above will be omitted and the reference numerals used for the cooling system 300 are used.

Figure 11:
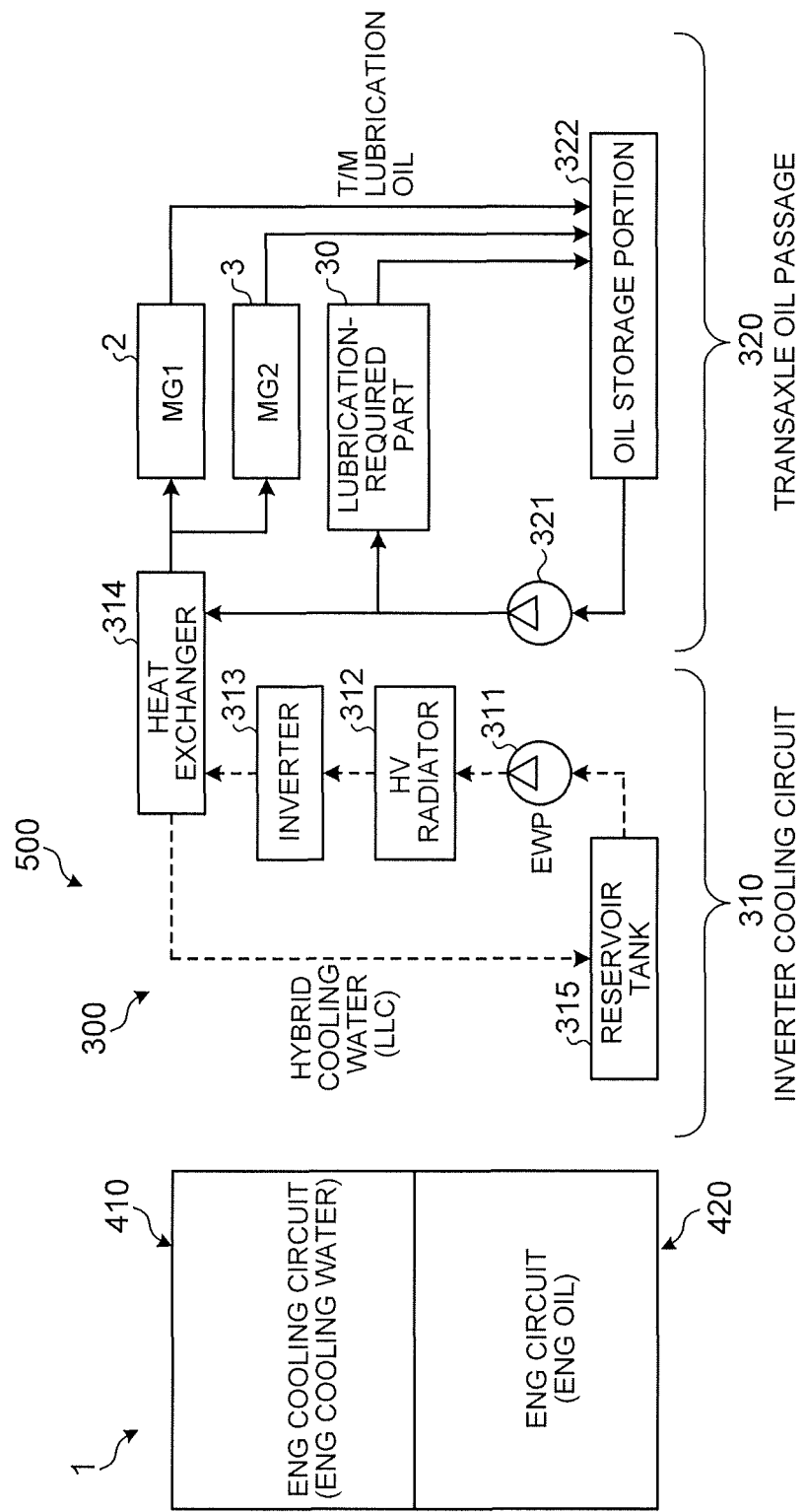
FIG. 11 is a diagram for describing a cooling system according to another reference example.

FIG. 11 is a schematic diagram illustrating a schematic configuration of a cooling system 500 according to a reference example. As illustrated in FIG. 11, the cooling system 500 according to the reference example includes no above-described heat exchanger 105. In other words, in the cooling system 500, no heat exchange is performed between T/M oil and a liquid on the engine 1 side (ENG cooling water in an ENG cooling circuit 410 or ENG oil in an ENG oil circuit 420). Therefore, in the cooling system 500, when a lubrication-required part 30 is warmed, the T/M oil cannot be warmed by the liquid on the engine 1 side (the ENG cooling water or the ENG oil), resulting in a delay in temperature increase of the T/M oil. Thus, in a normal moving state, stirring loss and dragging loss caused by the lubrication-required part 30 may become large. Also, in a high-load moving state, coolability of the T/M oil decreases, which may result in an increase of loss (copper loss and iron loss) in motor components.

Advantages of the second embodiment include warming performance and fuel efficiency in addition to advantages similar to those of the first embodiment described above (cooling performance and structure). According to the second embodiment, at the time of warming, heat exchange is performed between the liquid on the engine 1 side (ENG cooling water or ENG oil) and the T/M oil, and thus an increase of the T/M oil temperature Ttm is quickened, enabling quick completion of the warming. Consequently, stirring loss and dragging loss (T/M friction) in the lubrication-required part 30 can be reduced, enabling enhancement in fuel efficiency.

Furthermore, by performing switching control in consideration of a ENG cooling water temperature Thw, friction in the engine 1 (hereinafter referred to as "ENG friction") and an adverse effect on ENG fuel consumption control can be minimized. Also, when an oil temperature sensitivity of ENG friction for the ENG oil is compared to an oil temperature sensitivity of T/M friction for the T/M oil, the oil temperature sensitivity of the T/M friction is larger than the oil temperature sensitivity of the ENG friction. Thus, if the ENG oil temperature Toil is in a state in which the ENG oil temperature Toil is higher than the T/M oil temperature Ttm, transfer of heat of the ENG oil to the T/M oil reduces the T/M friction, enabling enhancement in fuel efficiency. Here, the ENG friction decreases as the ENG oil temperature Toil increases.

As described above, reduction in pressure loss caused by the T/M oil and expansion of the operation limit oil temperature range for the electric oil pump 102 ensure a sufficient flow amount (ensures a necessary flow amount) of the T/M oil and enhances a degree of freedom in the electric oil pump. Consequently, an oil circulation circuit 200 having a circuit configuration in which an inverter circuit and a transaxle oil passage are integrated can be provided.

As described above, according to the second embodiment, in addition to the effects provided by the above-described first embodiment, the T/M oil can quickly be warmed and warming of the power transmission mechanism is quickly completed, and thus, T/M friction is reduced, enabling enhancement in fuel efficiency.

Note that the vehicular cooling system according to the present disclosure is not limited to the second embodiment described above, and arbitrary changes are possible without departing from the object of the present disclosure.

For example, each of the switching valves 411, 421 is not limited to an electromagnetic valve and may be formed of an ON-OFF valve that can be controlled by the control unit 150.

Also, the first oil temperature sensor 151 may be installed on the upstream side relative the heat exchanger 105 in the lubrication circuit 220. For example, the first oil temperature sensor 151 may be provided in the oil storage portion 104 and detect a temperature Ttm of the T/M oil stored in the oil storage portion 104. Likewise, an installation position of the water temperature sensor 152 is not specifically limited as long as the installation position is upstream of the heat exchanger 105 in the ENG cooling circuit 410. An installation position of the second oil temperature sensor 153 is also not specifically limited as long as the installation position is upstream of the heat exchanger 105 in the ENG oil circuit 420.

What is claimed is:

1. A vehicular cooling system installed in a vehicle including an electric motor, an inverter electrically connected to the electric motor, and a power transmission mechanism that transmits motive power output from the electric motor to a wheel, the vehicular cooling system comprising:
    an oil circulation circuit including
      an oil storage portion;
      a first circuit including a first oil pump that sucks in oil stored in the oil storage portion and discharges the oil as a coolant to be supplied to the inverter and the electric motor, and an oil cooler provided between the first oil pump, and the inverter or the electric motor, the oil cooler cooling the oil to be supplied to the inverter and the electric motor; and
      a second circuit including a second oil pump that sucks in the oil stored in the oil storage portion and discharges the oil to be supplied to a lubrication-required part included in the power transmission mechanism without passing through the oil cooler.

2. The vehicular cooling system according to claim 1, wherein in the first circuit, the inverter and the electric motor are provided on a downstream side of the first oil pump, the inverter and the electric motor are connected in series, and the electric motor is provided on a downstream side of the inverter.

3. The vehicular cooling system according to claim 1, wherein in the first circuit, the inverter and the electric motor are provided on a downstream side of the first oil pump, and the inverter and the electric motor are connected in parallel.

4. The vehicular cooling system according to claim 1, wherein the electric motor includes a stator and a rotor, and in the first circuit, an electric motor cooling pipe for supplying oil to the electric motor includes a discharge hole for discharging oil toward the stator.

5. The vehicular cooling system according to claim 1, wherein the oil flowing in the first circuit has an insulating property.

6. The vehicular cooling system according to claim 1, wherein the inverter is configured such that the oil discharged from the first oil pump flows inside as the coolant.

7. The vehicular cooling system according to claim 1, wherein the oil cooler is an air cooling oil cooler that causes heat exchange between the oil and air.

8. The vehicular cooling system according to claim 1, wherein:
    the vehicular cooling system is installed in the vehicle including the electric motor and an engine as motive power sources;
    the first oil pump is an electric oil pump to be driven by the electric motor; and
    the second oil pump is a mechanical oil pump to be driven by the engine.

9. The vehicular cooling system according to claim 8, wherein the second circuit further includes a three phase heat exchanger configured to allow heat exchange between engine cooling water and the oil discharged from the second oil pump, and allows heat exchange between engine oil and the oil discharged from the second oil pump.

10. The vehicular cooling system according to claim 9, further comprising:
    a first switching valve provided in a circuit in which the engine cooling water circulates, the first switching valve switching between an open state in which a flow of the engine cooling water through the heat exchanger is allowed and a closed state in which the flow of the engine cooling water through the heat exchanger is not allowed; and
    a second switching valve provided in a circuit in which the engine oil circulates, the second switching valve switching between an open state in which a flow of the engine oil through the heat exchanger is allowed and a closed state in which the flow of the engine oil through the heat exchanger is not allowed.

11. The vehicular cooling system according to claim 10, further comprising:
    a first oil temperature sensor that detects a temperature of the oil;
    a water temperature sensor that detects a temperature of the engine cooling water;
    a second oil temperature sensor that detects a temperature of the engine oil; and
    a control unit configured to control opening-closing of each of the first switching valve and the second switching valve based on the temperature of the oil detected by the first oil temperature sensor, the temperature of the engine cooling water detected by the water temperature sensor and the temperature of the engine oil detected by the second oil temperature sensor,
    wherein the control unit is configured to, when the temperature of the oil is lower than a predetermined oil temperature, control at least the second switching valve out of the first switching valve and the second switching valve to be in the open state, and perform warming control to increase the temperature of the oil via heat exchange in the heat exchanger.

12. The vehicular cooling system according to claim 11, wherein the control unit is configured to, in a case where the control unit performs the warming control, when the temperature of the engine cooling water is higher than a predetermined water temperature, control the first switching valve and the second switching valve to be in the open states.

13. The vehicular cooling system according to claim 11, wherein the control unit is configured to, in a case where the control unit performs the warming control, when the temperature of the engine cooling water is equal to or below a predetermined water temperature and the temperature of the oil is lower than the temperature of the engine oil, control the first switching valve to be in the closed state and control the second switching valve to be in the open state.

* * * * *